US010229452B2

(12) United States Patent
Sia, Jr. et al.

(10) Patent No.: US 10,229,452 B2
(45) Date of Patent: Mar. 12, 2019

(54) NON-MONETARY BIDDING BASED ON BIDDER-SPECIFIC DATA

(71) Applicants: Jose K. Sia, Jr., Hillsboro, OR (US); Kenneth Anderson, Portland, OR (US); Anthony Salvador, Portland, OR (US)

(72) Inventors: Jose K. Sia, Jr., Hillsboro, OR (US); Kenneth Anderson, Portland, OR (US); Anthony Salvador, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,645

(22) PCT Filed: Jun. 22, 2013

(86) PCT No.: PCT/US2013/047204
§ 371 (c)(1),
(2) Date: Dec. 19, 2013

(87) PCT Pub. No.: WO2014/204493
PCT Pub. Date: Dec. 24, 2014

(65) Prior Publication Data
US 2015/0348180 A1 Dec. 3, 2015

(51) Int. Cl.
*G06Q 30/00* (2012.01)
*G06F 17/30* (2006.01)
*G06Q 30/08* (2012.01)

(52) U.S. Cl.
CPC .................................... *G06Q 30/08* (2013.01)

(58) Field of Classification Search
CPC ........ G06Q 30/08; G06Q 40/04; G06Q 30/02; G06Q 40/025; G06Q 40/08; G06Q 50/01; G06Q 30/0601–30/0645; G06N 5/04
(Continued)

(56) References Cited

U.S. PATENT DOCUMENTS 7,778,853 B2 * 8/2010 Sussman ................ G06Q 10/02 705/37
8,781,913 B1 * 7/2014 Murray .................. G06Q 30/08 705/26.3
(Continued)

FOREIGN PATENT DOCUMENTS

JP 2002-183504 A 6/2002
JP 2013-521550 A 6/2013
(Continued)

OTHER PUBLICATIONS

Chang, W. (2011). An investigation into the design of procurement auctions (Order No. 3483547). Available from ProQuest Dissertations & Theses Global. (902729874). Retrieved from https://search.proquest.com/docview/902729874?accountid=14753.*
(Continued)

*Primary Examiner* — Kathleen Palavecino
(74) *Attorney, Agent, or Firm* — Schwabe, Williamson & Wyatt, P.C.

(57) ABSTRACT

Technologies are presented that provide automated non-monetary bidding based on bidder-specific data. A method includes receiving, from a bid acceptance server, an information request associated with a bidder; collecting and analyzing data regarding one or more data points associated with the bidder and requested in the information request; packaging analysis results into a bid; and providing the bid to the bid acceptance server. The data points may be limited based on input from the bidder. The data analyzed may include electronically-available data associated with the bidder. The method may be performed at the bid acceptance server, at a device of a bidder, or at a combination of the two. Submitted bids may be ranked by the bid acceptance server according to a given algorithm.

16 Claims, 14 Drawing Sheets

(58) Field of Classification Search
USPC ........................................ 705/26.1–27.2
See application file for complete search history.

(56) References Cited

U.S. PATENT DOCUMENTS

| | | | | |
|---|---|---|---|---|
| 2002/0194103 A1 | | 12/2002 | Nabe | |
| 2005/0010484 A1* | | 1/2005 | Bohannon | G06Q 30/06 705/26.5 |
| 2006/0136324 A1* | | 6/2006 | Barry | G06Q 30/08 705/37 |
| 2007/0136178 A1* | | 6/2007 | Wiseman | G06Q 30/02 705/37 |
| 2009/0191962 A1* | | 7/2009 | Hardy | G07F 17/32 463/29 |
| 2009/0248541 A1 | | 10/2009 | Asher et al. | |
| 2010/0043055 A1* | | 2/2010 | Baumgart | G06Q 20/12 726/2 |
| 2010/0256999 A1 | | 10/2010 | Ghani et al. | |
| 2011/0184779 A1 | | 7/2011 | Mittal et al. | |
| 2012/0110071 A1* | | 5/2012 | Zhou | G06Q 10/10 709/204 |
| 2012/0246036 A1* | | 9/2012 | Marr | G06Q 30/08 705/27.1 |
| 2013/0124356 A1* | | 5/2013 | Bhogal | G06Q 50/01 705/26.3 |
| 2014/0236704 A1* | | 8/2014 | Billmaier | G06Q 30/0251 705/14.39 |

FOREIGN PATENT DOCUMENTS

| | | |
|---|---|---|
| KR | 1020040026337 | 3/2004 |
| KR | 1020050036161 | 4/2005 |
| KR | 1020060005153 | 1/2006 |
| KR | 20110059703 A | 6/2011 |
| KR | 20120028885 A | 3/2012 |
| KR | 20120030437 A | 3/2012 |
| KR | 20120061861 A | 6/2012 |

OTHER PUBLICATIONS

International Search Report and Written Opinion received for PCT Patent Application No. PCT/US2013/047204, dated Mar. 21, 2014, 12 Pages.
Office Action dated Mar. 28, 2017 for Korean Patent Application No. 10-2015-7033259, 4 pages.
Office Action dated Jul. 2, 2018 for Chinese Patent Application No. 201380076781.6, 12 pages.
Office Action dated Nov. 7, 2017 for Japanese Patent Application No. 2016-5213889, 7 pages.
Office Action dated Feb. 28, 2018 for Korean Patent Application No. 10-2015-7033259, 4 pages.
Office Action dated May 30, 2018 for Japanese Patent Application No. 2016-521388, 7 pages.
Extended European Search Report dated Nov. 11, 2016 for European Patent Application No. 13887120.7, 9 pages.
Office Action dated Jan. 24, 2017 for Japanese Patent Application No. 2016-5213889, 4 pages.
Office Action dated Sep. 30, 2017 for Korean Patent Application No. 10-2015-7033259, 8 pages.
Office Action dated Oct. 4, 2018 for Korean Patent Application No. 10-2015-7033259, 6 pages.

* cited by examiner

NON-MONETARY BIDDING BASED ON BIDDER-SPECIFIC DATA

BACKGROUND

Currently, when a consumer would like to purchase or obtain a scarce or highly sought after item (e.g., a limited edition item such as a baseball card, tickets to a limited seating event, etc.), the consumer may have limited options for obtaining the item, primarily based on time and money. For example, for a ticket to a popular concert or an event with limited seating, a consumer must make the ticket purchase (e.g., through an online ticketing service) prior to the item selling out (which in some cases may occur in a matter of minutes), or may need to pay a third-party ticketing agency or a ticket scalper an amount of money well above face value in order to attend. For a scarce item up for auction, for example, a consumer would need to monetarily outbid everyone else within the allotted auction time window. Although wealth and speed may be considered cornerstones of commercialism, these sale mechanisms do not give a vendor a say in what the vendor wants to see in consumers of its items, and further, they do not give a consumer a chance to show the value the consumer may provide to the vendor if provided the item.

BRIEF DESCRIPTION OF THE DRAWINGS/FIGURES

FIGS. 1-6 each illustrate an exemplary block diagram of the systems described herein, according to various embodiments described herein.

Figure 1:
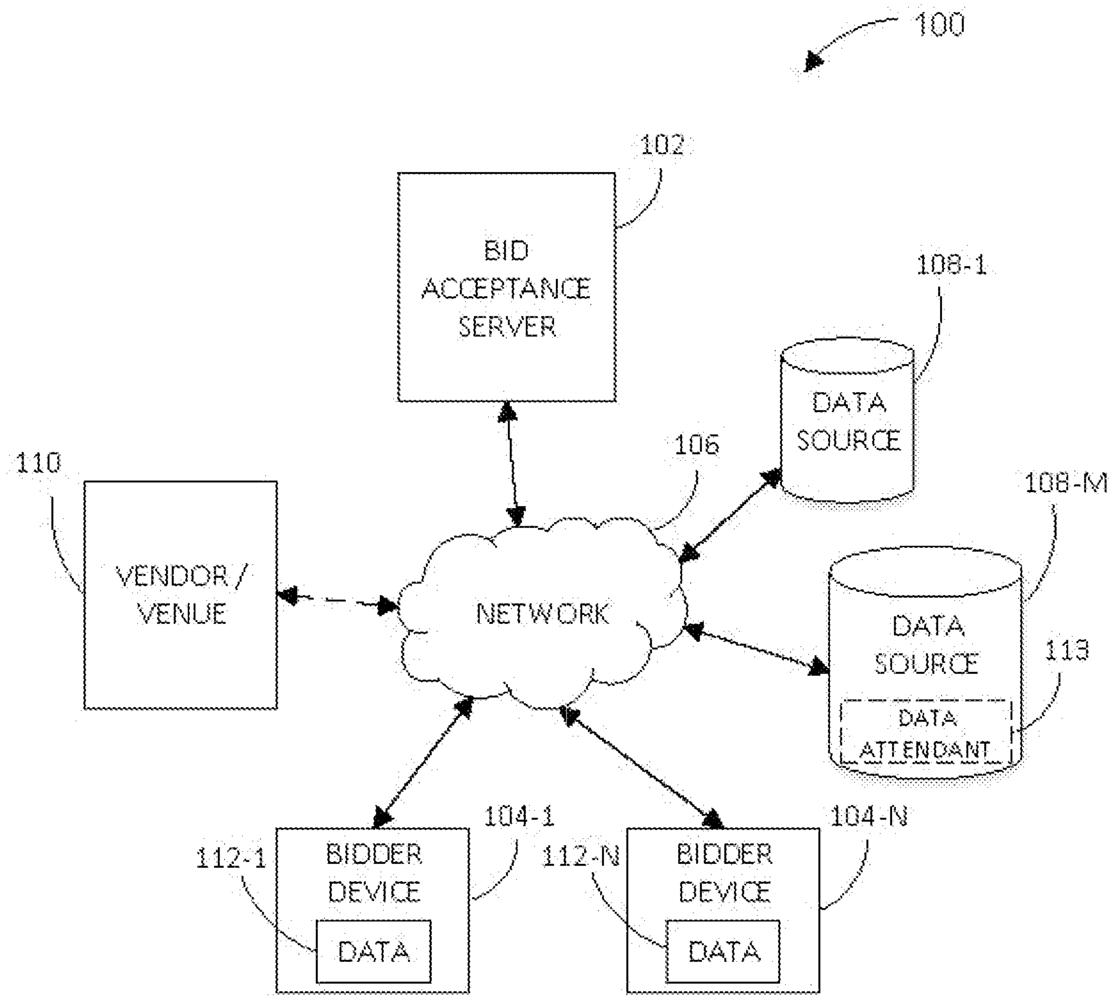

In the drawings, the leftmost digit(s) of a reference number may identify the drawing in which the reference number first appears.

DETAILED DESCRIPTION

When a consumer competes for a scarce item, such as a concert ticket or other highly sought-after item, there is no easy automated way for him or her to replace or supplement a monetary bid with data that shows that he or she can provide non-monetary value to the vendor or seller. In tight housing markets, some buyers do more than just make an offer that is higher than list price. They also write heartfelt letters to the sellers in an attempt to convince the sellers that they are the perfect people to buy the house. These letters aim to create an emotional bond with the sellers and convey that the value a particular buyer brings to the transaction is more than the money, but includes other intangible considerations. However, these letters rely on trust among parties and do not offer any guarantee or concrete measures. The systems described herein aim to automate a process of supplementing or replacing monetary bids with data that can attest to qualities and outcomes that are desired by a vendor. Use of these systems may enable a vendor to have consumers compete for items by sharing relevant personal data to show that they will provide the most value to the providers of the item and should be the ones to have the item over other consumers.

Disclosed herein are technologies that solve the technical problem of how to automatically effectuate the collection of bids of a non-monetary nature that provide a high indication of value potential to a provider of an item or service.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

One scenario that is well-suited for using the systems described herein is a scenario in which a very popular band (e.g., Coldplay) may be scheduled to perform at a very small venue (e.g., the (fictitious) Atomic Lounge). Although this one scenario will be described for ease of understanding, this is not to be a limiting example. Many scenarios may benefit from the systems described herein.

In this scenario, the Atomic Lounge may be a tiny hip concert venue that only has room for three hundred people. For a diehard Coldplay fan, this may be the chance of a lifetime. Normally, a potential ticket-purchaser would visit the website of a ticketing service just prior to the time the desired tickets are scheduled to go on sale and attempt to purchase one or more tickets prior to the tickets selling out. For very popular bands, tickets may sell out in a matter of minutes, and the chances of successfully purchasing a ticket may depend on various factors, such as speed or strength of the internet connection, typing speed and accuracy, accessibility of credit card information, etc. However, for this concert, instead of purchasing tickets directly, bids may be taken, giving the provider (e.g., the venue and/or the band, etc.) an opportunity to limit the attendees to those who may provide them with the most value (e.g., most profits, most advertising potential, most energy, most fun, etc.). In other words, the Atomic Lounge and/or the band Coldplay may choose the attendees based on traits they value in a concert-goer, with anticipation of those attendees providing them with the most possible value.

The Atomic Lounge may be most interested in attendee traits that include, for example, the ability to pay for a ticket, an assurance that the ticket-purchaser will actually attend the concert (i.e., that the ticket-purchaser is not a scalper), the likelihood that the buyer will purchase a certain amount of food and/or beverages at the event (which may make the Lounge the most profit), the likelihood that the buyer has attended or will attend other shows at the Atomic Lounge (e.g., as a reward for loyal customers), the buyer's match to the Atomic Lounge's target demographic (e.g., to help solidify or maintain the Lounge's reputation for a certain type of crowd), etc. The band Coldplay, on the other hand, may be interested in traits such as, for example, the likelihood that the buyer will purchase a given amount of merchandise at the show, a high degree of "super-fandom" (e.g., a fan that attends many of their shows and/or owns many, if not all, of their albums, etc.), an ability to generate a lot of buzz regarding the band or that particular show through social media (e.g., through Twitter®, Facebook®, blogging, etc.), an ability to change a friend's musical listening habits (e.g., through media recommendation services, etc.), etc. For the bidding system described herein, the venue and/or the band may request and collect customized bids based on, for example, the above-described desirable traits in order to customize the attendee crowd for optimized value.

In an embodiment, a potential ticket purchaser may visit a website, for example, to obtain his or her Coldplay tickets. For example, the website may be a website of the venue, of the band, or of a third-party ticketing service. From the website, instead of being directed to a purchasing screen, the potential ticket purchaser may be informed of the special bidding system being used for this particular concert and may be asked if he or she would like to be included as a bidder. In an embodiment, in order to be placed in the running as a potential bidder, the potential ticket purchaser may be asked to supply some identifying information that, at the very least, may include an email address, for example. In an embodiment, the bidding process may not continue until the potential bidder receives a message (e.g., an email, a text message, a Tweet® (via Twitter®), an instant message, etc.) from the bidding system server (referred to herein as a "bid acceptance server") on a personal computing device (e.g., personal computer (PC), laptop computer, smart device (e.g., smart phone, smart tablet or smart televisions), etc.). The received message may, for example, direct the potential bidder to a web page to continue the bidding process, or may prompt the potential bidder to download an application to run to continue the bidding process. In an alternative embodiment, the website that the potential ticket purchaser initially visited to obtain the tickets may direct the potential bidder to continue the bidding process via the present web page (or another web page) without sending a message to the potential bidder. In any of these embodiments, the potential bidder may be asked to confirm his or her intent to place a bid and/or asked to answer questions regarding what types of data the potential bidder will or will not allow the system to electronically access to formulate a bid. For example, in an embodiment, the potential bidder may be able to indicate that he or she will allow access to purchase histories and credit card data, but will not allow access to certain personal files or messages (e.g., text messages). In another embodiment, the potential bidder may allow access to certain types of raw data for analysis, and will allow analysis results to be transmitted as part of a bid, but will not allow the raw data itself to be transmitted. This provides a potential bidder some control over what personal data is electronically accessed and/or analyzed to formulate a bid. Once a potential bidder has provided the above-described permissions, the bidder may be considered a confirmed bidder, and the data analysis process may begin. In an embodiment, once a given threshold number of confirmed bidders is reached, the bidding system may not allow any more bidders. For example, in the concert scenario, if there are three hundred available tickets for the concert, then the system may be set to allow a higher number of bidders (e.g., one thousand bidders) to allow the system to the select the three hundred bidders that the venue and band believe are most deserving of admittance to this particular concert.

FIG. 1 illustrates an exemplary block diagram of a bidding system 100, according to an embodiment. Bidding system 100 may include a bid acceptance server 102, one or more bidder devices 104-1 to 104-N (collectively 104), in communication via a network 106. The bid acceptance server 102 may be implemented in software and/or hardware executed or controlled by a controller of the bid acceptance server 102. While only one bid acceptance server is illustrated for clarity and ease of discussion, it should be appreciated that the bid acceptance server may include multiple distributed server computers for redundancy and/or load sharing, for example.

The bidder devices 104 may be computing devices that may include mobile and non-mobile devices. Mobile devices may include, but are not to be limited to, for example, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaining consoles, etc. Non-mobile devices may include, but are not to be limited to, for example, personal computers (PCs), televisions, smart televisions, data communication devices, media playing devices, gaming consoles, etc. The bidder devices 104 are user devices (e.g., personal user devices of the bidders) that may include controllers and other components that execute software and/or control hardware in order to execute local programs or consume services provided by external service providers over a network. For example, the bidder devices 104 may include one or more software clients or applications for utilizing or accessing web-based services (e.g., online stores, social networking services, blogging services, etc.). The bidder devices 104 may also, or instead, include a web interface running in a browser from which the bidder device can access such web-based services. Bidder devices 104 may also include storage devices 112-1 to 112-N (collectively 112) to store logic and data associated with the programs and services used by the users of the bidder devices.

The network 106 may be any wired or wireless network, such as a Wide Area Network (WAN), a Local Area Network (LAN), and/or the like. As an example, the network 106 may be a distributed public network, such as the Internet, where the bid acceptance server 102 and the bidder devices 104 are connected to the network 106 via wired or wireless connections.

Bidding system 100 may also include data sources 108-1 to 108-M (collectively 108) that contain data associated with the web-based services consumed by the bidders via bidder devices 104. Data sources 108 may be controlled by the service providers of the web-based services (e.g., online stores, social networking services, blogging services, etc.). In embodiments described herein, data residing at the data sources 108 may be accessed by the bidding system over network 106, as will be described in more detail below. In embodiments, the bidding service may have an agreement with an external web-based service provider to allow access to certain data stored at a data source 108 for bidding purposes. This access may be managed by a data attendant 113 that resides at the data source. Data attendant 113 may be implemented in software and/or hardware and may be controlled by a controller managed by the external web-based service, for example.

Figure 2:
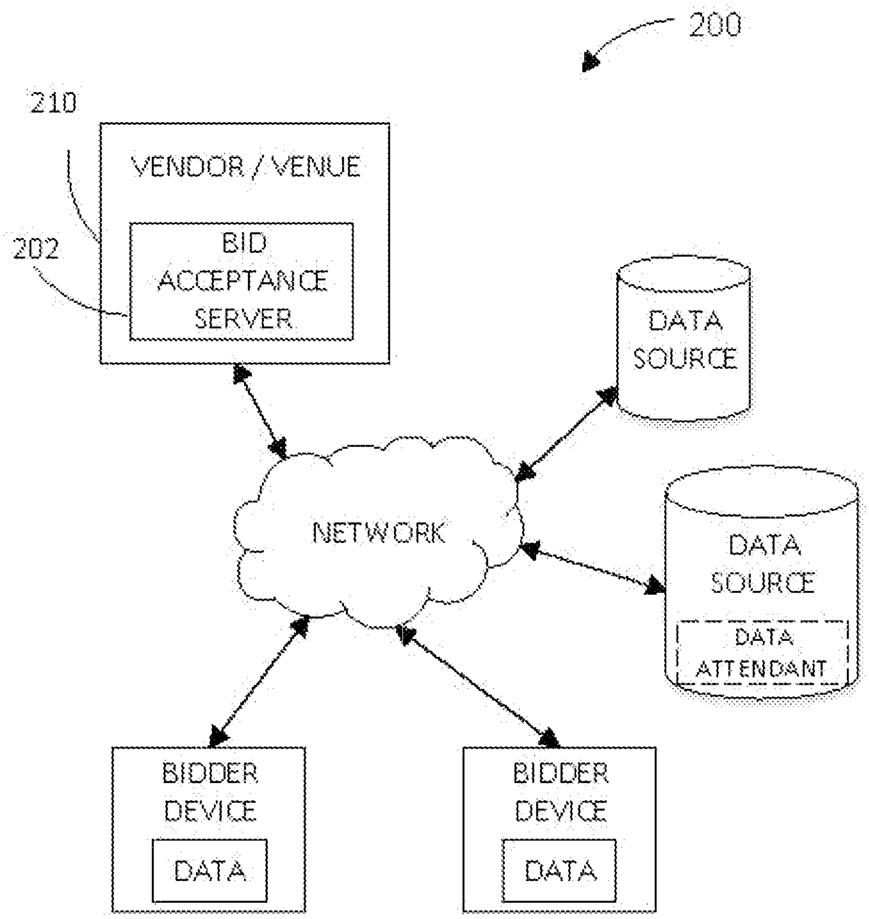

A customer or client of the bidding service provided by the bidding system may include, as described earlier, a vendor of an item or service (e.g., a merchant, a ticketing service, etc.) and/or a venue of an event, for example. In the concert example, a venue may work with a ticketing service to sell tickets to the concert. In an alternative example, the venue itself (e.g., the Atomic Lounge) may be the vendor of the tickets directly. In either case, the bidding service may be provided through a third-party service, where the bid acceptance server is separately controlled by the third-party service, as shown in FIG. 1. As shown in FIG. 1, a computing device 110 of the venue or vendor may be in communication with the bid acceptance server 102 via network 106 in order to have access to information such as bidding status, bidding results, bidding system administration, etc. In an alternative embodiment, the bidding service may be provided directly from a vendor or venue, as shown in FIG. 2. In FIG. 2, bidding system 200 shows a bid acceptance server 202 integrated with the computing system(s) 210 of the vendor or venue.

As a general overview of an embodiment of the bidding system, for every confirmed bidder, an aggregator may be assigned (e.g., by the bid acceptance server) to oversee the automated collection and analysis of electronically-available data associated with the bidder. The aggregator may be provided with an information request specific to the bidder. In the concert example, the information request may have been customized with input from the venue or band to look for traits that the venue or band would like to see in a concert attendee. The information request may also have been limited with input from the bidder with regard to the types of data the bidder deems acceptable to access and/or analyze. The aggregator may spawn and/or direct one or more analyzers to collect and analyze information regarding specific data points from the information request. Each analyzer may determine instruction(s) or algorithm(s) to run for each specific data point and may determine what specific data items are required and where to look for them (e.g., computing devices of the bidder, databases of external web-based services, etc.). Each analyzer may spawn and/or direct one or more data agents to obtain each specific data item and provide them to the analyzer. Each analyzer may analyze the obtained data (e.g., by running the determined instruction(s) or algorithm(s)) and return the results to the aggregator. The aggregator may package the analysis results into a bid to be provided for consideration. This process will be described in greater detail later in this document.

Figure 3:
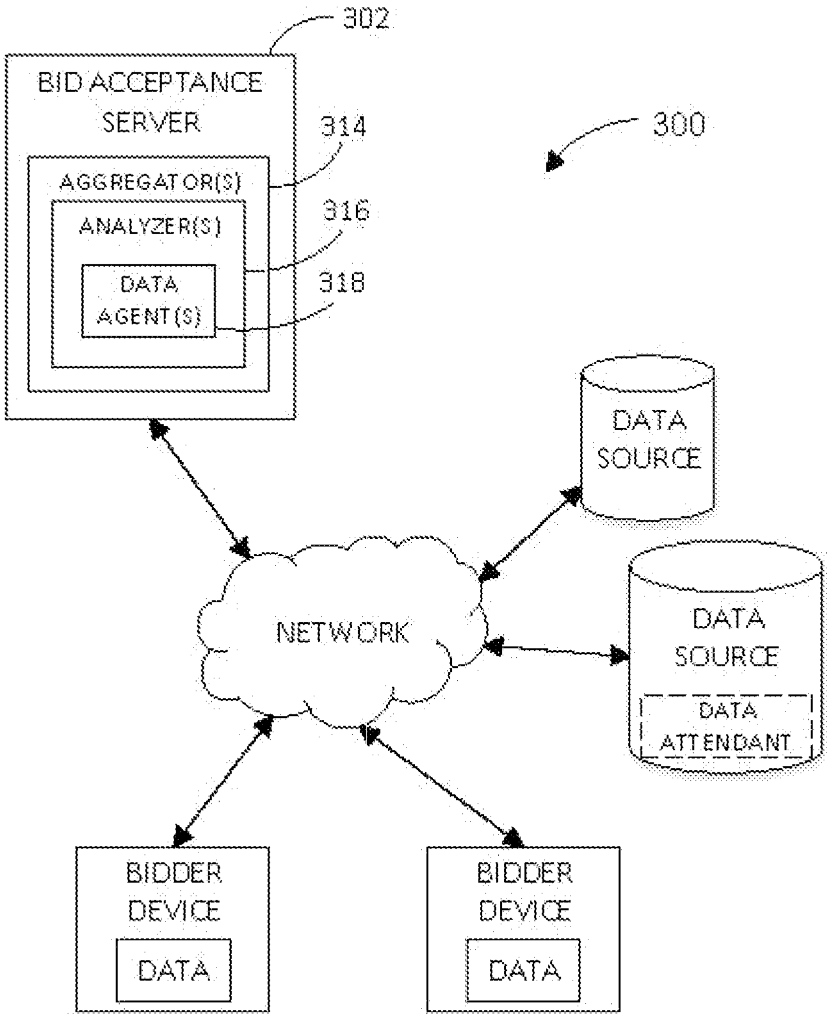
Figure 4:
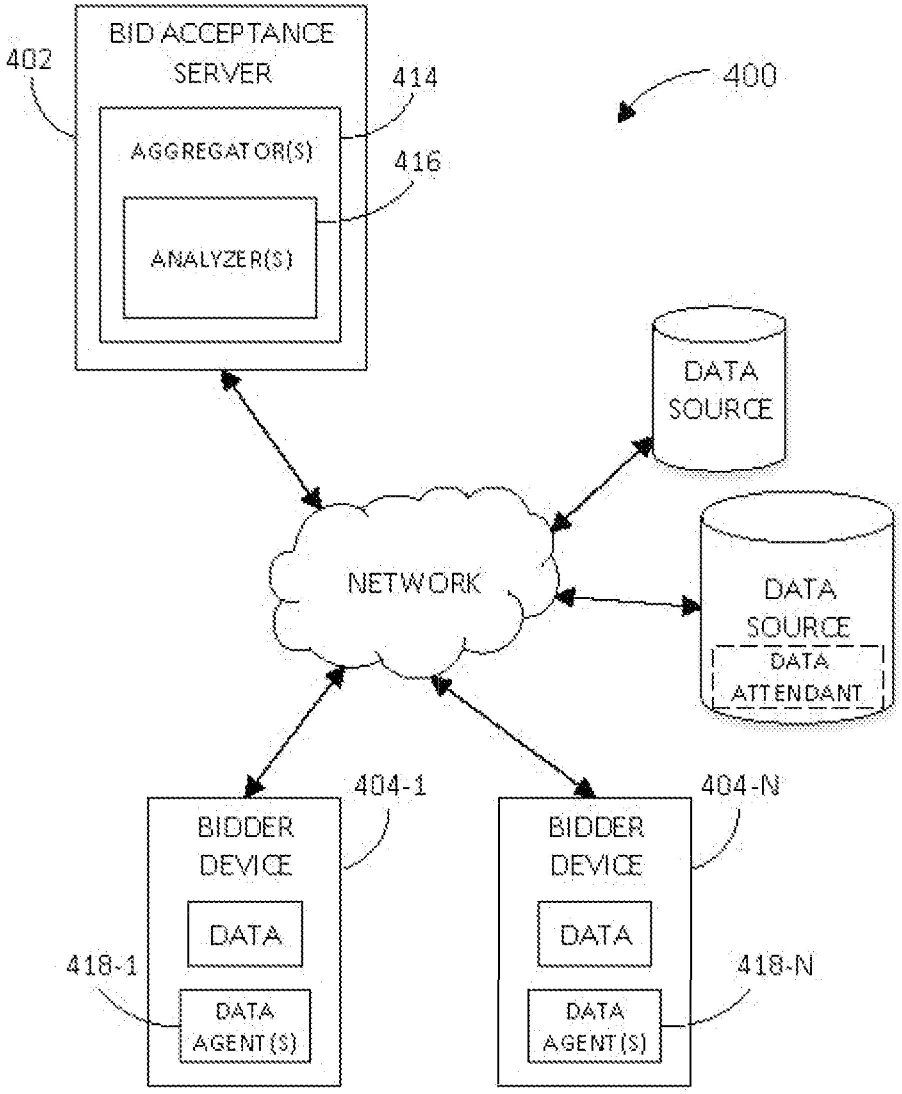
Figure 5:
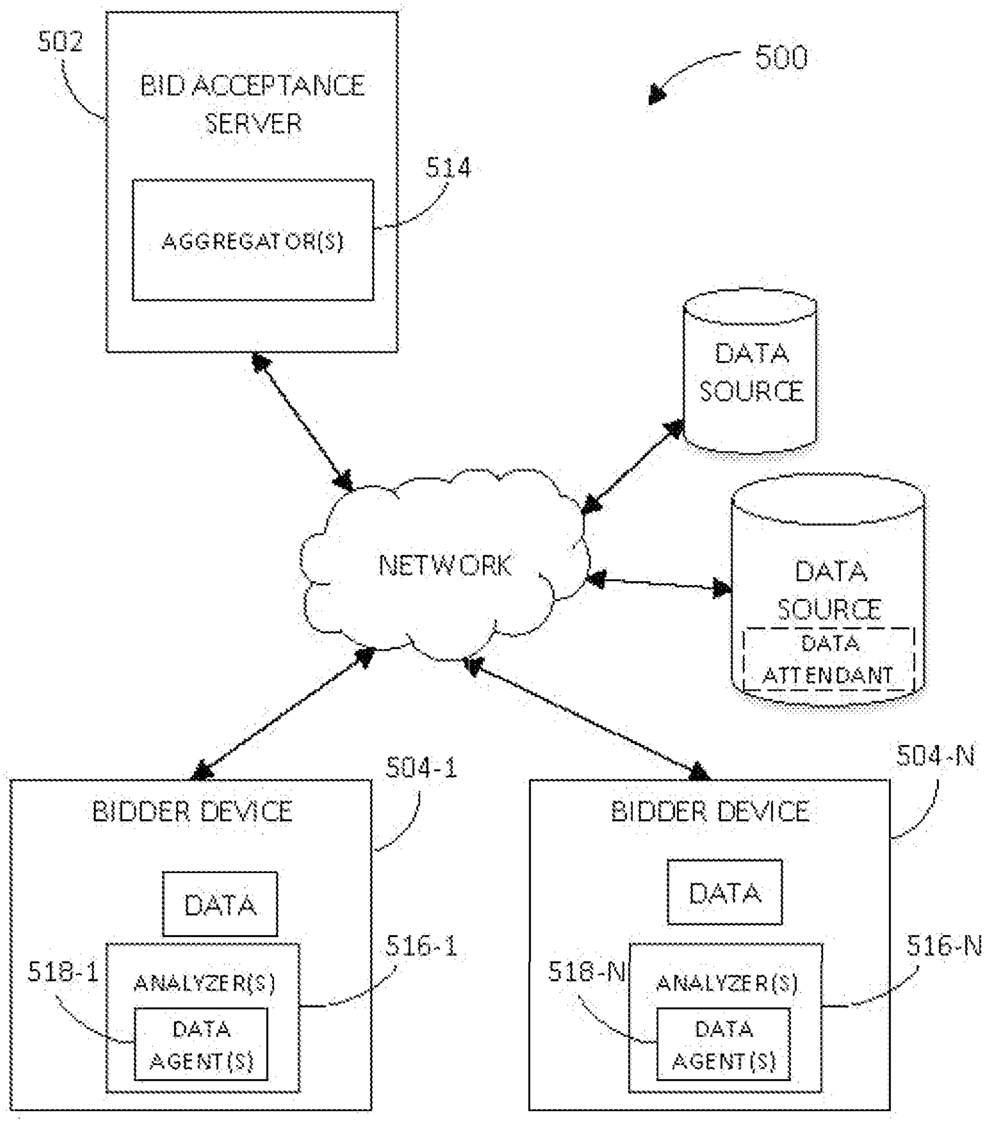
Figure 6:
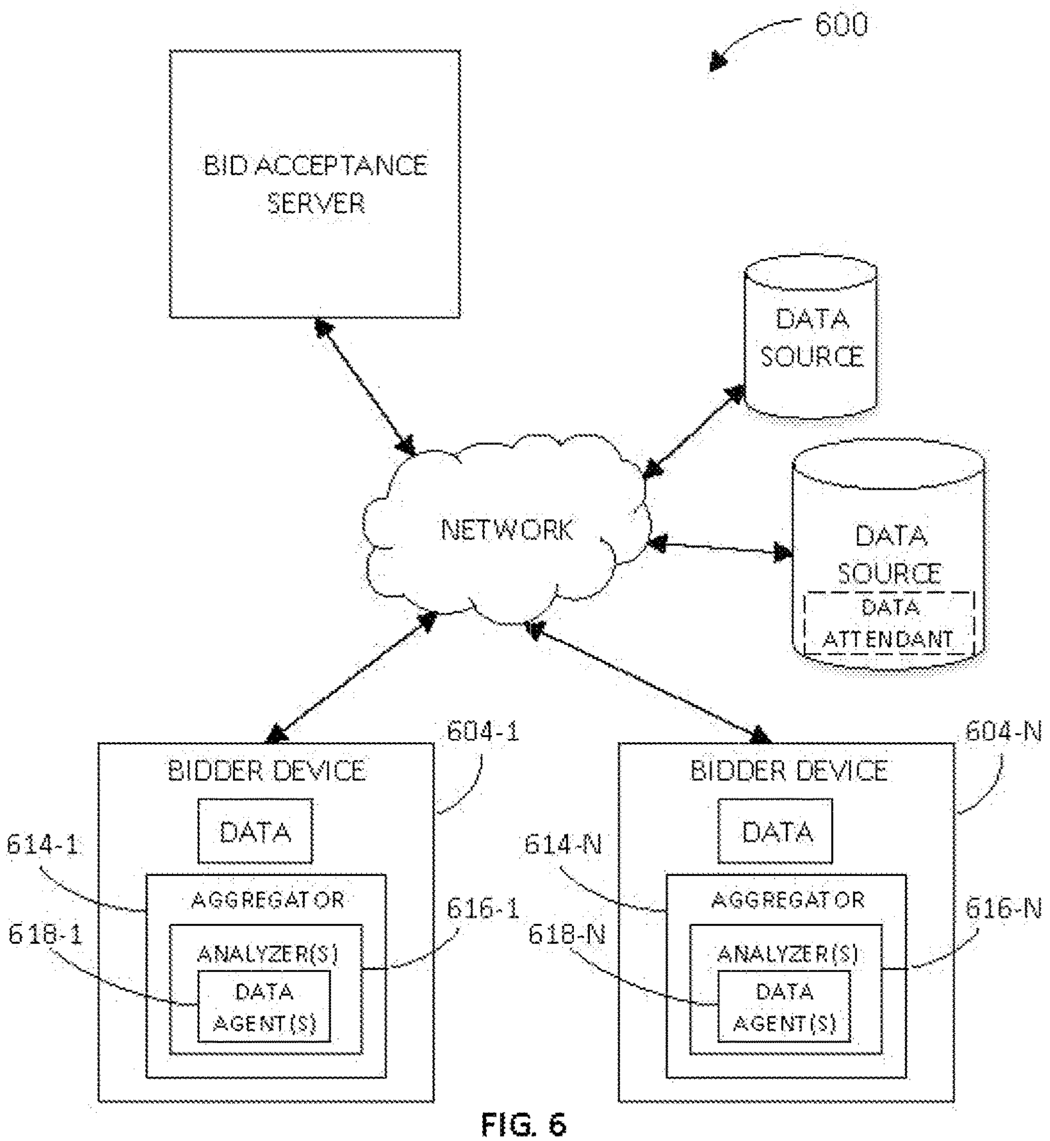

In an embodiment, the aggregator(s), analyzer(s), and data agent(s) may be at the bid acceptance server, as shown in FIG. 3, where bid acceptance server 302 includes aggregator(s) 314, analyzer(s) 316, and data agents(s) 318. In another embodiment, the aggregator(s) and analyzer(s) may be at the bid acceptance server, as shown in FIG. 4, where bid acceptance server 402 includes aggregator(s) 414 and analyzer(s) 416, and the data agent(s) 418 may be at the bidder devices 404. In this embodiment the data agent(s) 418 may be provided to, and executed by, the bidder devices 404. In a further embodiment, the aggregator(s) may be at the bid acceptance server, as shown in FIG. 5, where bid acceptance server 502 includes aggregator(s) 514, and the analyzer(s) 516 and data agent(s) 518 may be at the bidder devices 504. In this embodiment, the analyzer agent(s), which may include the data agent(s) 518, may be provided to, and executed by, the bidder devices 504. In a still further embodiment, as shown in FIG. 6, the aggregator(s) 614, analyzer(s) 616, and data agent(s) 618 may be at the bidder devices 604. In this embodiment, an aggregator agent, which may include analyzer agent(s) and data agent(s), may be provided to, and executed by, the bidder devices 604. In FIGS. 3-6, the aggregator(s), analyzer(s) and/or data agent(s) are shown as nested in some way. This is not meant to be limiting. In alternative embodiments, these may be separate components within the bid acceptance server or the bidder devices.

A more detailed description of various embodiments of the bidding system(s) will now be presented.

Figure 7:
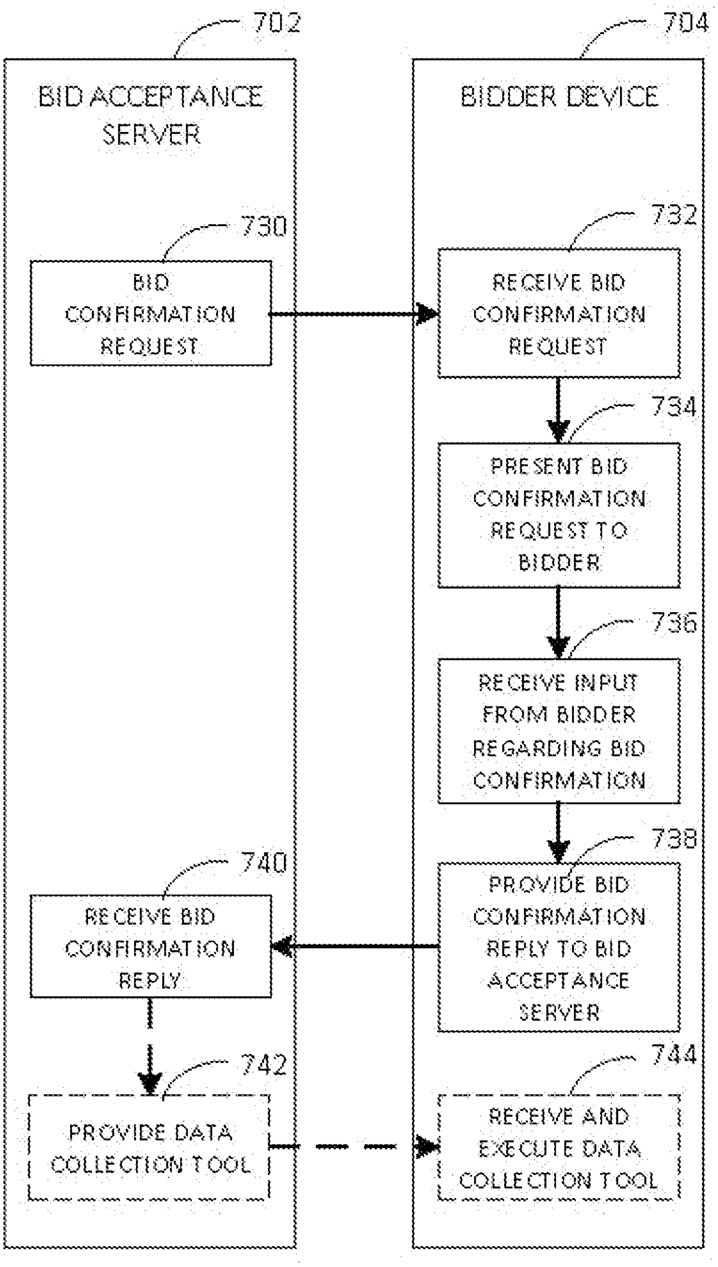
FIG. 7 is a sequence diagram illustrating an exemplary process flow for confirming a bid intention with the system described herein, according to an embodiment.

FIG. 7 is a sequence diagram illustrating an exemplary process flow for confirming a bid intention with the system described herein, according to an embodiment. Still using the concert scenario as an example, if a person shows interest in purchasing a ticket to the special small-venue concert (e.g., that person may have clicked on an advertisement or announcement of that concert on a website, or Facebook page, for example, of the venue, the band, or a ticketing agency), that person may be informed of the bidding opportunity and asked if he or she would like to participate. For potential bidders that would like to participate, bid acceptance server 702 may provide a bid confirmation request to a bidder device 704 of a bidder (730). Bidder device 704 may receive the bid confirmation request (732) and present the bid confirmation request to the bidder (734), via a user interface on the bidder device, for example. In an embodiment, the bid confirmation request may be provided to the bidder device, and ultimately the bidder, by displaying a bid confirmation web page. In another embodiment, the bid confirmation request may be sent via a message (e.g., an email, text message, instant message, etc.) to the bidder from which the bidder can be directed to a bid confirmation web page. In a further embodiment, the bid confirmation request may be provided to the bidder device as a downloadable application that the bidder device may download and execute. Other ways of providing a bid confirmation request to a bidder may also be contemplated.

Bidder device 704 may receive input from the bidder (736). The bid confirmation request may request some further information from the bidder to be used in the bidding process. In an embodiment, the bid confirmation request may request an input from the bidder directly confirming that the bidder truly intends to submit a bid. This may also be a way of having a bidder electronically "agree" to bidding rules, terms, and/or conditions, for example. In another embodiment, the bid confirmation request may request input from the bidder with regard to what types of data the bidder will allow to be accessed and/or analyzed to formulate a bid, as discussed earlier herein. The bidder may provide this requested input via the displayed web page or downloaded application, for example, using a user interface on the bidder device.

The bidder device 704 may provide a bid confirmation acknowledgment or reply to the bid acceptance server 702 (738). In an embodiment, this may be done, for example, in response to the bidder clicking on a "Submit" button on the bid confirmation web page, or downloaded application screen, once the bidder completes entering the requested input. Bid acceptance server 702 may receive the bid confirmation reply (740). In an embodiment, to move forward with the data analysis portion of the bidding process, the bid acceptance server 702 may optionally provide a data collection tool to the bidder device 704 (742), and the bidder device 704 may receive the data collection tool (744). For example, for use in the embodiment shown in FIG. 4, bid acceptance server 702 may provide one or more data agents to bidder device 704 for data collection. In this embodiment, the data agent(s) may be downloaded and executed by bidder device 704. In another example, for use in the embodiment shown in FIG. 5, bid acceptance server 702 may provide one or more analyzer agents, which may include one or more data agents, to bidder device 704. In this embodiment, the analyzer agent(s) (and any spawned data agents) may be downloaded and executed by bidder device 704. In a further example, for use in the embodiment shown in FIG. 6, bid acceptance server 702 may provide an aggregator agent, which may include one or more analyzer agents and one or more data agents, to bidder device 704. In this embodiment, the aggregator agent (and any spawned analyzer agents and data agents) may be executed by bidder device 704. The data collection tool may be provided to bidder device 704 as a downloadable application. In an embodiment, the data collection tool may have been provided with the bid confirmation request described above. In another embodiment, the data collection tool and bid confirmation request may both be included in a single downloadable application.

Figure 8:
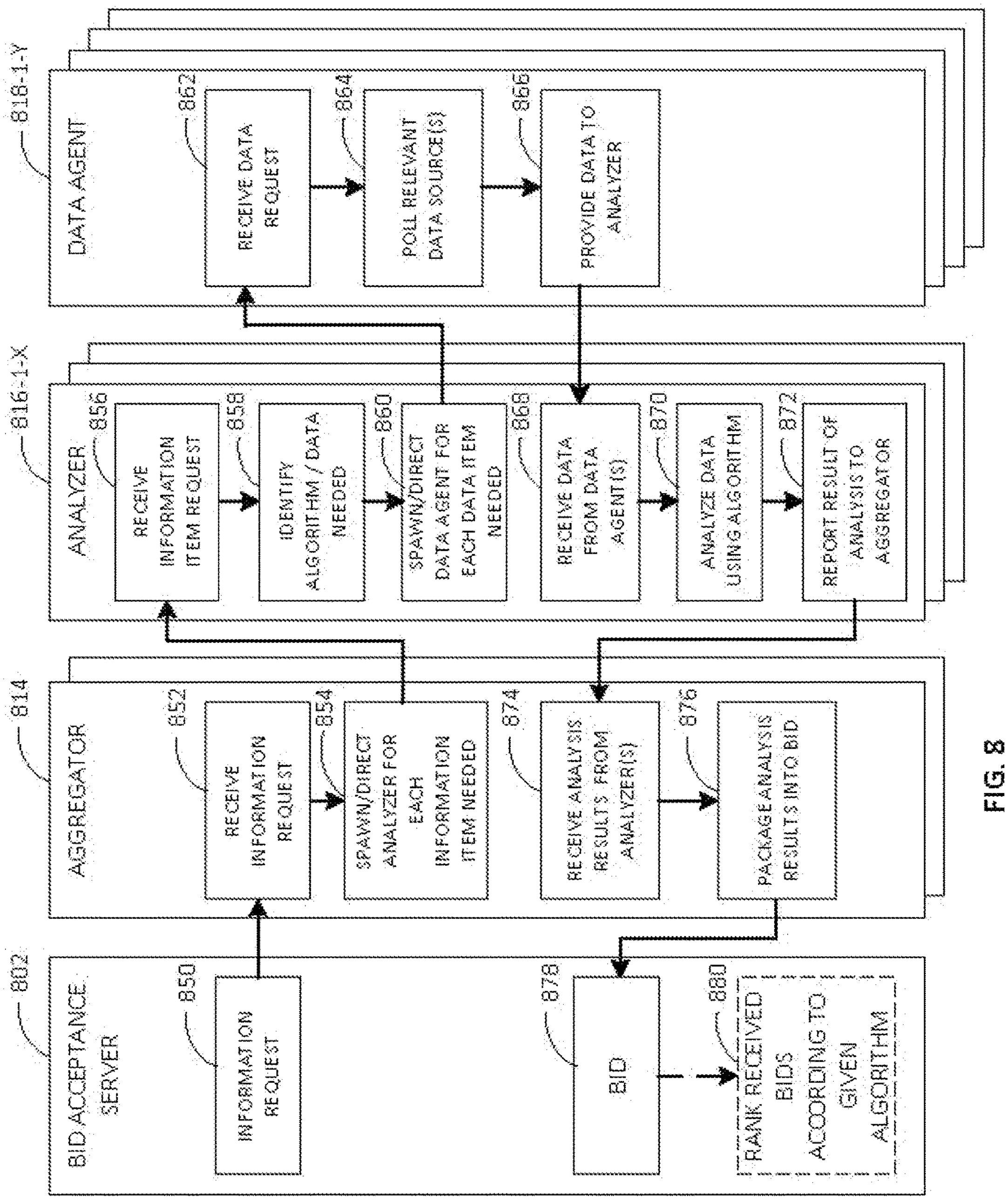
FIG. 8 is a sequence diagram illustrating an exemplary process flow for collecting a bid with the system described herein, according to an embodiment.

FIG. 8 is a sequence diagram illustrating an exemplary process flow for collecting a bid with the systems described herein, according to an embodiment. An information request may be provided to an aggregator 814 by bid acceptance server 802 (850), and aggregator 814 receives the information request (852). In an embodiment, aggregator 814 may be co-located with bid acceptance server 802. In an alternate embodiment, aggregator 814 may be located at a user device of a bidder (i.e., bidder device). The information request may include a request for information regarding the bidder that has been defined using traits that provider(s) of an item or service (e.g., in the concert example, the venue and/or the hand who are providing a concert ticket) have expressed as desirable. In an embodiment, the information request may have been limited based on previously obtained input from the bidder regarding what types of data the bidder has deemed acceptable to access and/or analyze to formulate a bid. By way of the concert example, the information request may include, but is not to be limited to, the following example inquiries: whether the bidder has the ability to pay for a ticket, the likelihood that the bidder will actually attend the concert (i.e., that the bidder is not a scalper), the likelihood that the bidder will purchase a certain amount of food and/or beverages at the event (which may make the venue the most profit), the likelihood that the bidder has attended or will attend other shows at the venue (e.g., as a reward for loyal customers), the bidder's match to the venue's target demographic (e.g., to help solidify or maintain the venue's reputation for a certain type of crowd, the likelihood that the bidder will purchase a given amount of merchandise at the show, the degree of "super-fandom" (e.g., a fan that attends many of the band's shows and/or owns many, if not all, of their albums, etc.), an ability to generate a lot of buzz regarding the band or that particular show through social media (e.g., through Twitter®, Facebook®, blogging, etc.), an ability to change a friend's musical listening habits (e.g., through media recommendation services, etc.), etc.

Aggregator 814, for each inquiry, for example, may spawn and/or direct an analyzer to obtain and analyze data associated with the bidder in response to that particular inquiry (854). As discussed above, depending on the embodiment, the analyzer may be co-located with the bid acceptance server or may be located at the bidder device. A particular analyzer 816 may receive an information item request for a particular inquiry (856) and may identify what algorithm may be needed to respond to that inquiry and what data may need to be obtained (858). In an embodiment, the algorithm may be chosen from a library of predetermined algorithms. The predetermined algorithms may have been limited based on input provided by the bidder, as discussed above, to provide some control over what types of data are accessed and/or analyzed to formulate a bid. For the concert example, taking the inquiry of whether the bidder will purchase a given amount of merchandise at the show as an example, the analyzer 816 may identify an algorithm that corresponds to that inquiry and determine that the following types of data may be needed: dates of concerts of this band or of bands of a similar genre that the bidder has attended perhaps over a certain time period, what types of purchases were made at those concerts, how many items were purchased at those concerts, how much was spent on merchandise at those concerts, what and/or how much band-related merchandise has been purchased at retail stores or from the band website, etc. The algorithms used by the system may depend upon the specifics of each information request and inquiries involved and are not described here.

For each specific data item needed, the analyzer 816 may spawn and/or direct one or more data agents 818 to obtain the data (860). Each data agent 818 may receive a data request (862). A data request may generally include, but is not to be limited to, an inquiry regarding, for example, one or more of purchasing history, spending history, location history, activity history, club membership information, social networking interactions, media usage history, media recommendations, friend media usage history, friend media recommendations, etc. In furthering our example, one or more particular data agents may receive a request to obtain data related to how much band-related merchandise has been purchased from retail stores or from the band website. For this inquiry, one or more data agents may need to obtain data regarding purchasing history and possibly spending history. The data agent(s) may poll one or more relevant data sources (e.g., electronically-accessible databases and storage devices) to obtain this information (864). Data source types may generally include, but are not to be limited to, for example, store records, credit card records, electronic receipts, location history data, club membership records, social networking history data, social networking comments, media usage records, media recommendation records, friend media usage records, friend media recommendation records, sensor data, blogs, Tweets® (via Twitter®), texts, emails, instant messages, other electronic messages, electronic documents, etc. Locations of these data sources may include, but are not to be limited to, one or more of one or more data files located on one or more devices associated with the bidder (locally-saved data files, emails, text messages, instant messages, Tweets® (via Twitter®), etc.), a personal cloud associated with the bidder, one or more databases associated with services provided to or used by the bidder (social networking services, online stores, shopping services, etc.), and one or more websites associated with the bidder (e.g., personal websites, blog websites, etc.). In once again furthering our example, one or more data agents may determine that it may be necessary to poll such data source types as store records, credit card records, and electronic receipts. In order to determine what records to poll, one or more data agents may look through a bidder's emails and/or other electronic files located on the bidder device for online order confirmations or receipts and/or confirmation of credit cards used by the bidder. In an embodiment, the data agent(s) may find what they are looking for on the bidder device. In other embodiments, the data agent(s) may use identifying information found on the bidder device (e.g., what credit cards the bidder uses, what online stores the bidder frequents, etc.) to poll external sources (such as, for example, databases of online retailers or credit card companies) for the desired information. Although privacy concerns are not to be addressed in this document, there may be safety precautions taken by external data sources such that certain data may be accessed without compromising privacy of the bidder or others, such as the use of data attendants discussed earlier, for example.

Once a data agent 818 obtains the data requested in its particular data request, it may provide that data to its analyzer 816 (866). Analyzer 816 may receive the data requested from the one or more data agents 818 it directed (868) and may analyze the data with respect to its assigned inquiry (870). In an embodiment, analyzer 816 may analyze the received data using an identified algorithm that corresponds to its assigned inquiry. Analyzer 816 may provide the results of its analysis to aggregator 814 (872). Aggregator 814 may receive results from the various analyses of its assigned analyzers (874) and may package these results into a bid associated with the bidder (876). Aggregator 814 may provide the bid to the bid acceptance server 802 (878). A bid may, for example, provide a summary of traits of a bidder that correspond to traits in which the item/service provider(s) are interested. For the concert example, a bid may state that a particular bidder is a diehard Coldplay fan who purchases a certain amount of merchandise at every concert he or she attends, but does not purchase a certain amount of food or beverages at concerts and does not use social media to promote music or venues. The bid may be clearly formatted as a report that is easy to read and understand, and/or it may include raw data that may require a data analyst to interpret.

Bid acceptance server 802 collects a bid from each aggregator 814 assigned to a respective bidder. In an embodiment, the bid acceptance server 802, or an administrator of the bid acceptance server 802, may provide the received bids to the party that is to determine which bidders are chosen to receive the item/service (e.g., a ticket, as per the concert example). In the concert example, that deciding party may be, for example, the venue, the band, and/or a ticketing agency. Bid selection may be automated to some degree, or may be completely automated. In an embodiment, the bid acceptance server 802 may rank the bids according to a given ranking algorithm (880), and the ranked results may subsequently be given to the deciding party to consider. The ranking algorithm may be based on criteria (e.g., weighted criteria) provided by the venue and/or the band, for example. The bidders that are chosen to receive the tickets may be contacted (via email, phone, text, etc., for example) with instructions on how to obtain them.

In the following paragraphs, embodiments of the bidding system are discussed, from the perspective of individual entities of the system, as illustrated in FIGS. 9-12.

Figure 9:
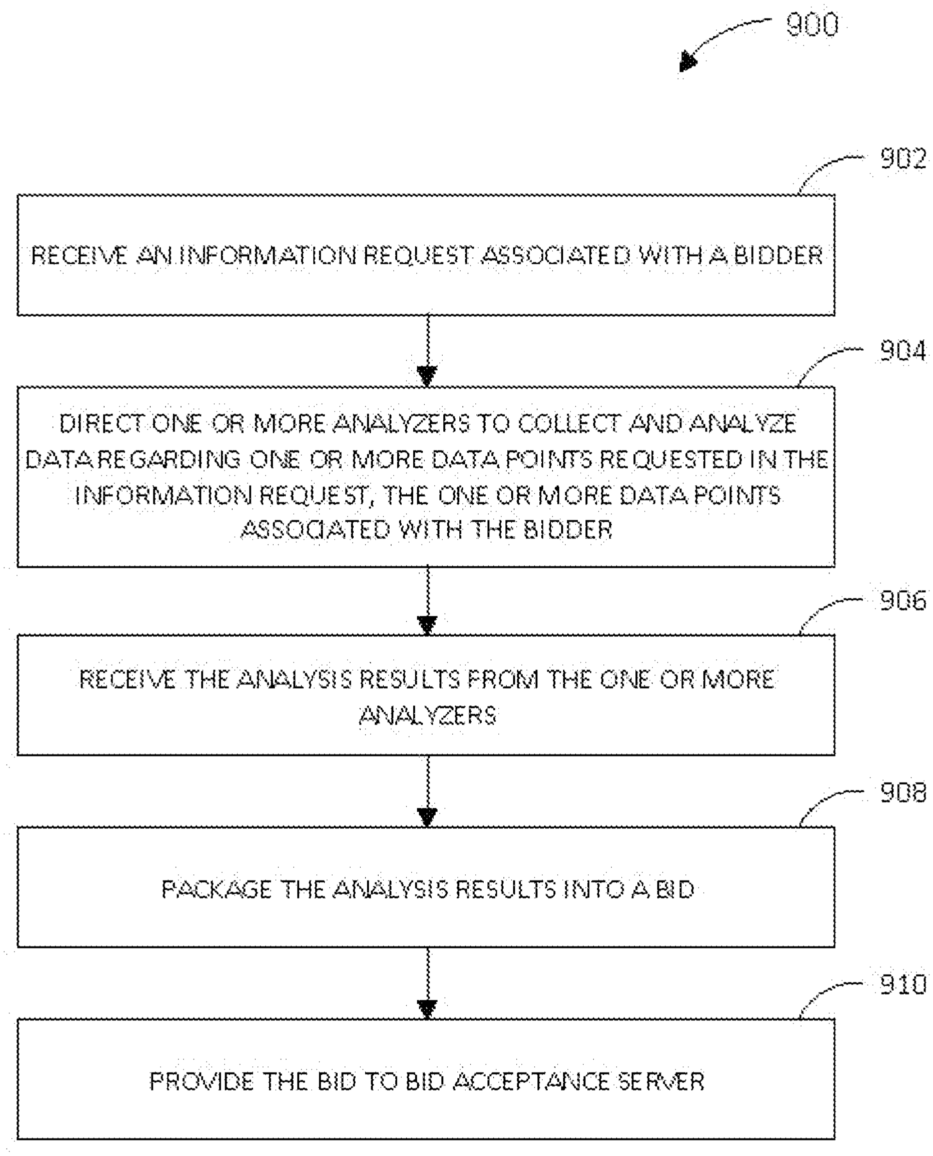
FIG. 9 is a flow chart illustrating an exemplary process flow described herein, from the perspective of an aggregator, according to an embodiment.

FIG. 9 is a flow chart illustrating an exemplary process flow 900, from the perspective of an aggregator, according to an embodiment. At 902, an information request associated with a bidder may be received. At 904, one or more analyzers may be directed to collect and analyze data regarding one or more data points, or particular inquiries, associated with the bidder that were specified in the information request. At 906, the analysis results may be received from the one or more analyzers. At 908, the analysis results may be packaged into a bid. At 910, the bid may be provided to a bid acceptance server (878).

Figure 10:
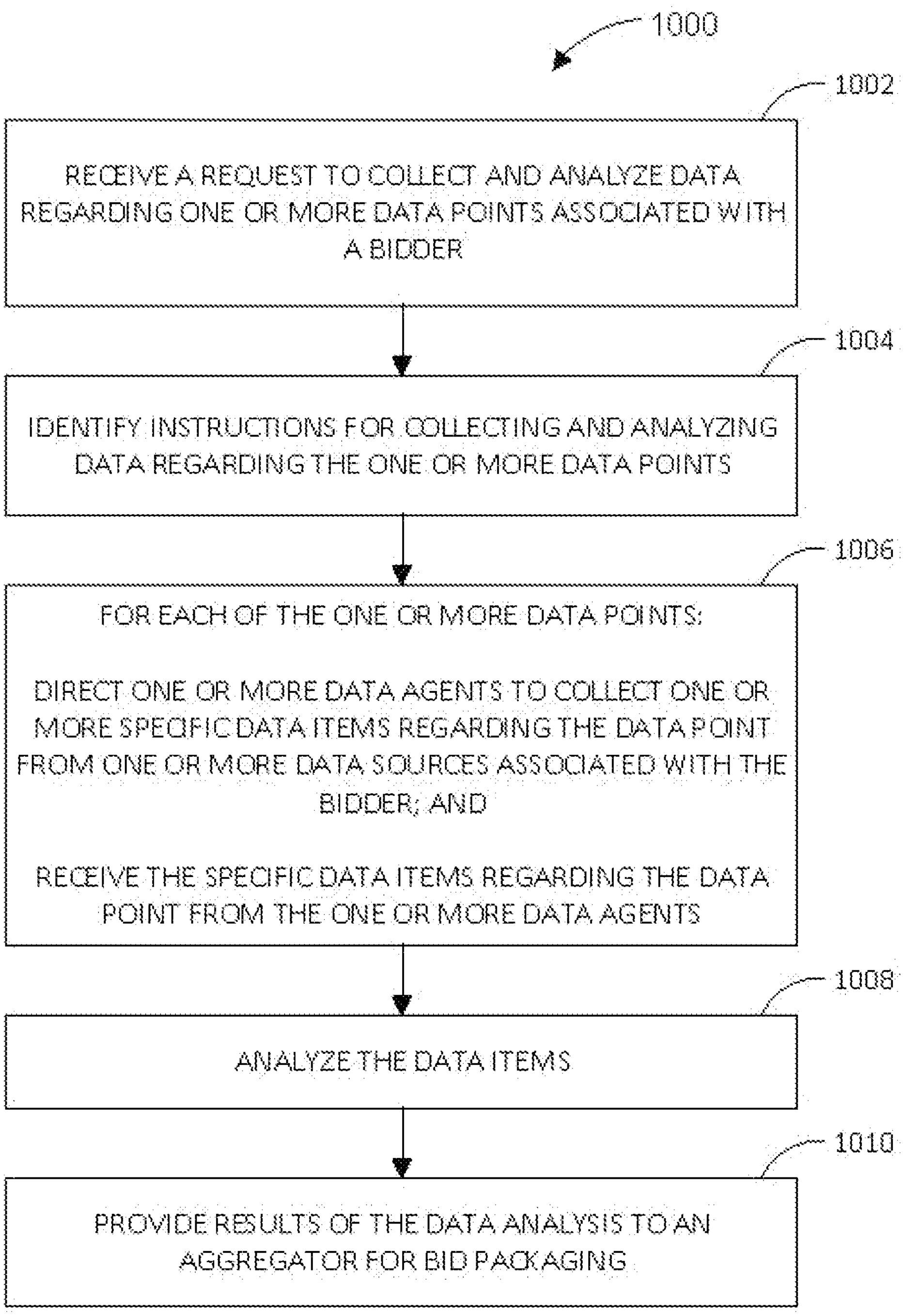
FIG. 10 is a flow chart illustrating an exemplary process flow described herein, from the perspective of an analyzer, according to an embodiment.

FIG. 10 is a flow chart illustrating an exemplary process flow 1000, from the perspective of an analyzer, according to an embodiment. At 1002, a request to collect and analyze data regarding one or more data points, or particular inquiries, associated with a bidder may be received (e.g., from an aggregator). At 1004, instructions for collecting and analyzing the data regarding the one or more data points may be identified. The instructions may include an algorithm to be run on the data once collected, and/or may identify what specific data items are needed and possibly where to look for that data. At 1006, for each of the one or more data points, one or more data agents may be directed to collect one or more specific data items regarding the data point from one or more data sources associated with the bidder, and the specific data items regarding the data point may be received from the data agents. At 1008, the specific data items may be analyzed. For example, an algorithm identified at 1004 may be run on the received data items. At 1010, the results of the data analysis may be provided to the aggregator for packaging into a bid.

Figure 11:
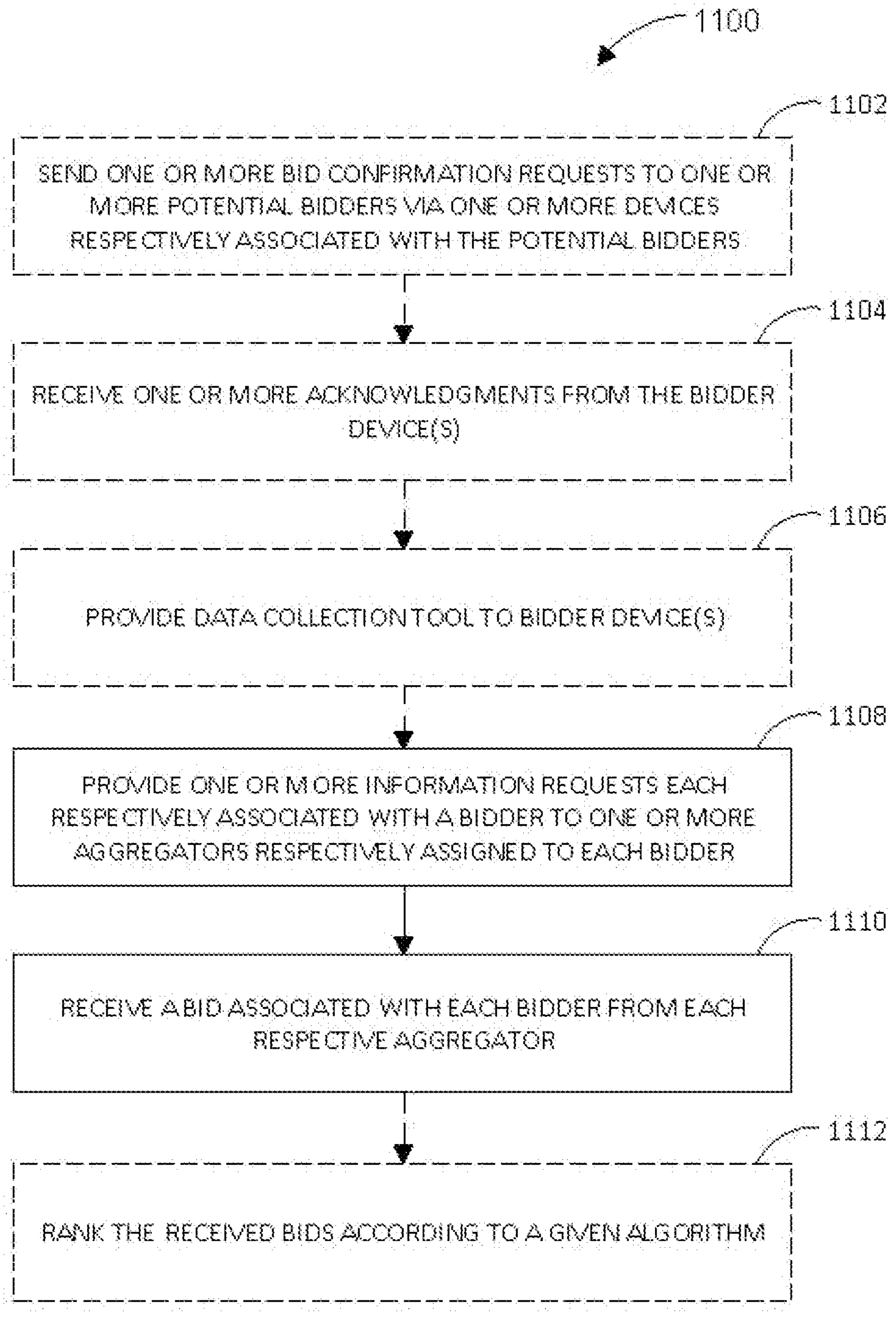
FIG. 11 is a flow chart illustrating an exemplary process flow described herein, from the perspective of a bid acceptance server, according to an embodiment.

FIG. 11 is a flow chart illustrating an exemplary process flow 1100, from the perspective of a bid acceptance server, according to an embodiment. Optionally, at 1102-1104, one or more bid confirmation requests may be sent to one or more potential bidders via one or more devices of the potential bidders, and one or more acknowledgments from the bidder devices may be received. The received acknowledgments may include confirmation that the potential bidder intends to submit a bid and/or information regarding what types of data the bidder will allow to be accessed and/or analyzed to formulate a bid. Also optionally, at 1106, a data collection tool may be provided to devices of confirmed bidders. In an embodiment, a data collection tool may be provided along with the bid confirmation request at 1102, though not necessarily executed until the bidder becomes confirmed. At 1108, one or more information requests respectively associated with a bidder may be provided to one or more aggregators respectively assigned to each bidder. At 1110, a bid associated with each bidder may be received from each respective aggregator. Optionally, at 1112, the received bids may be ranked according to a given algorithm. In the concert example, for example, a ranking algorithm may be based on criteria (e.g., weighted criteria) provided by the venue and/or the band.

Figure 12:
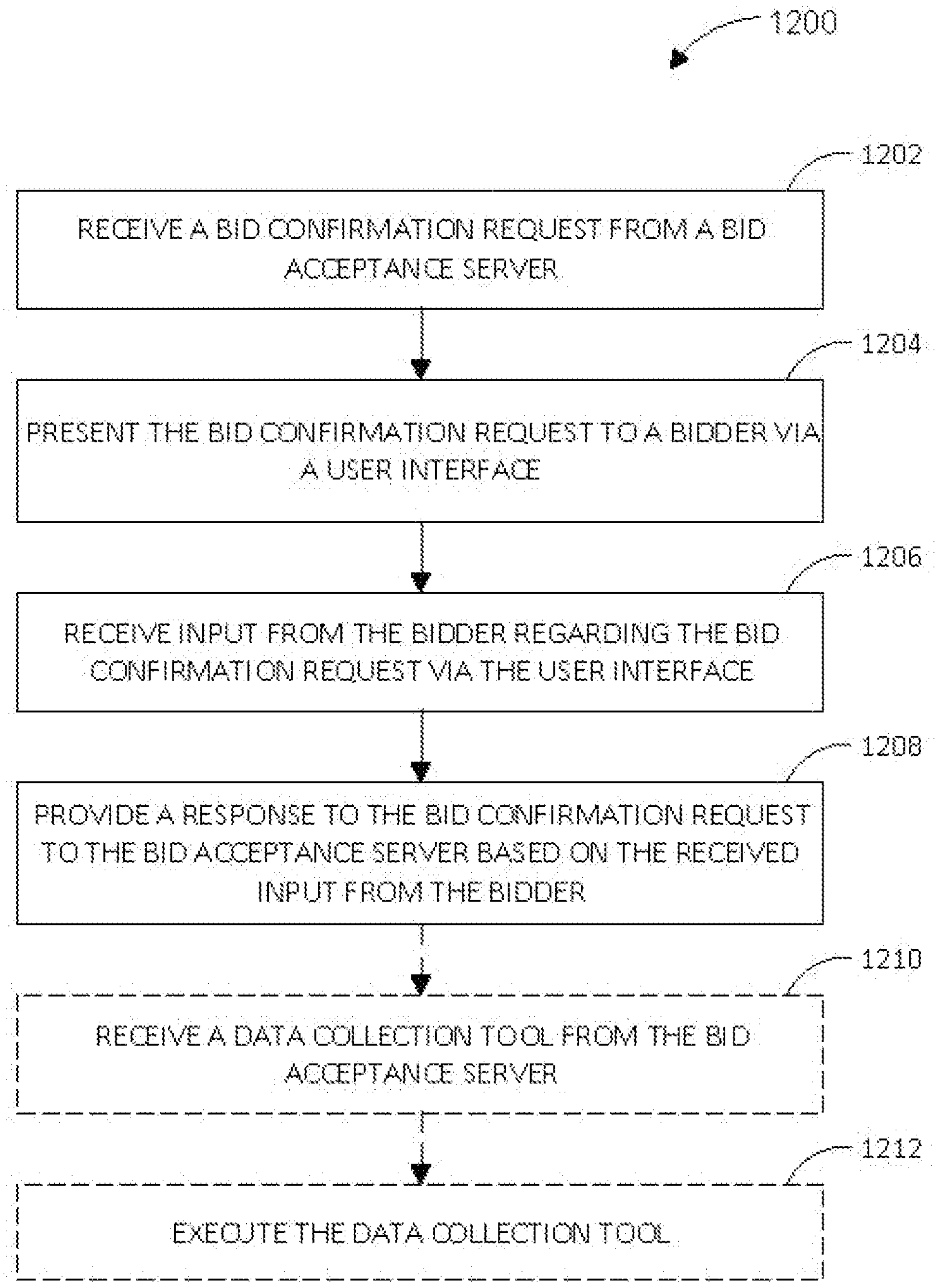
FIG. 12 is a flow chart illustrating an exemplary process flow described herein, from the perspective of a bidder device, according to an embodiment.

FIG. 12 is a flow chart illustrating an exemplary process flow 1200, from the perspective of a bidder device, according to an embodiment. At 1202, a bid confirmation request may be received from a bid acceptance server. At 1204, the bid confirmation request may be presented to a potential bidder via a user interface. At 1206, input from the bidder may be received, via the user interface, regarding the bid confirmation request. For example, the bidder may provide input confirming that the bidder intends to submit a bid and/or input defining what types of data the bidder will allow to be accessed and/or analyzed to formulate a bid. At 1208, a response to the bid confirmation request may be provided to the bid acceptance server based on the input received from the bidder. Optionally, at 1210, a data collection tool may be received from the bid acceptance server, and at 1212, the data collection tool may be executed (for embodiments such as those shown in FIGS. 4-6, for example, where a portion of the bidding system may be executed at the bidder device). In an embodiment, the data collection tool may be received with the bid confirmation request at 1202, though not necessarily downloaded or executed until the bidder becomes confirmed.

Figure 13:
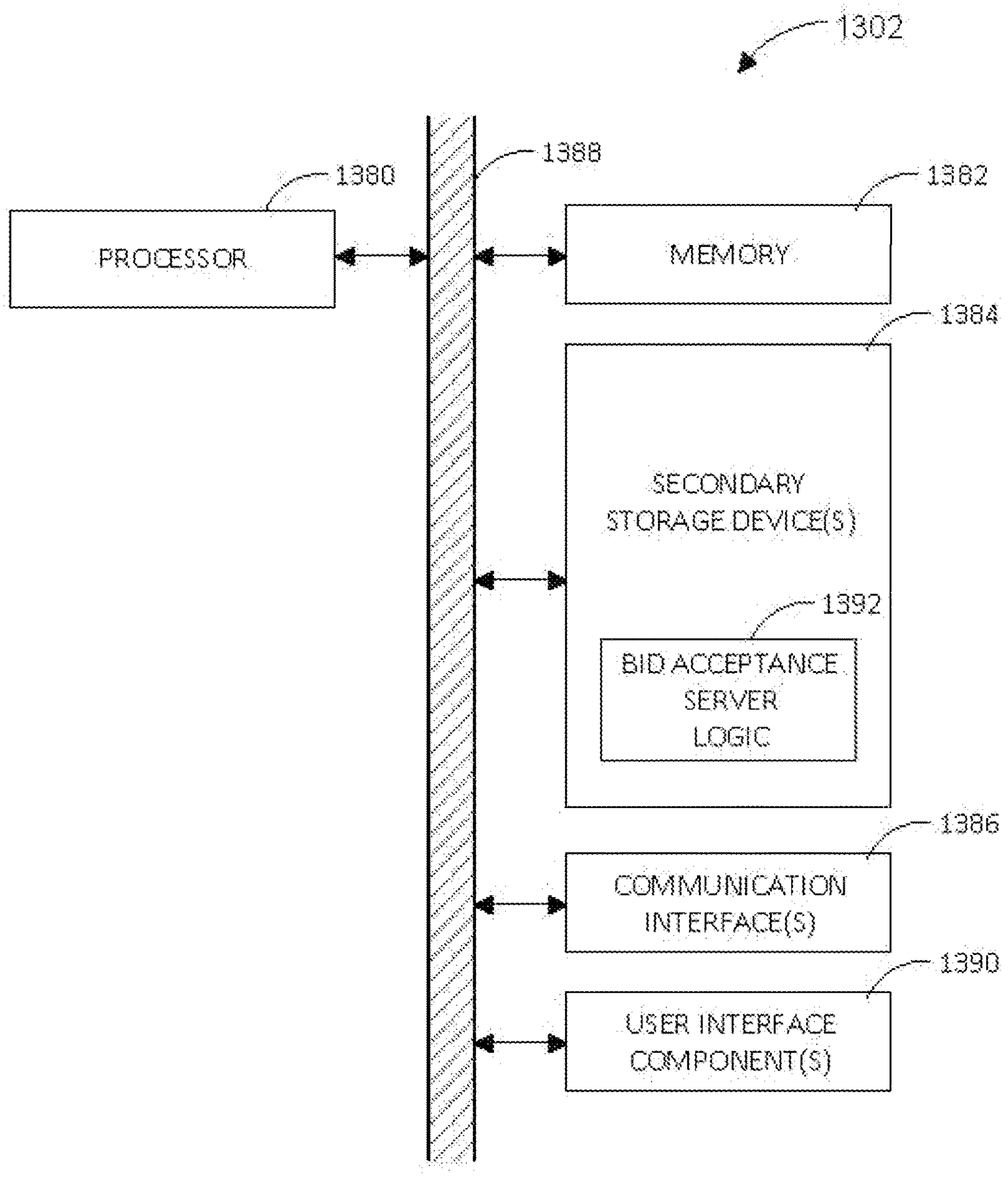
FIG. 13 is a block diagram of an example bid acceptance server, according to an embodiment.

FIG. 13 is a block diagram of an example bid acceptance server 1302, according to an embodiment. The bid acceptance server 1302 may represent, for example, the bid acceptance servers 102, 202, 302, 402, 502, 702, or 802 of FIGS. 1-5, 7, and 8 respectively. As illustrated, bid acceptance server 1302 may include a processor or controller 1380 connected to memory 1382, one or more secondary storage devices 1384, and a communication interface 1386 by a link 1388 or similar mechanism. The bid acceptance server 1302 may optionally include user interface components 1390 for use by a system or service administrator, for example, that may include, for example, a touchscreen, a display, one or more user input components (e.g., a keyboard, a mouse, etc.), a speaker, or the like, or any combination thereof. Note, however, that while not shown, bid acceptance server 1302 may include additional components. The processor 1380 may be a microprocessor, digital ASIC, FPGA, or similar hardware device. In an embodiment, the processor 1380 may be a microprocessor, and software may be stored or loaded into the memory 1382 for execution by the processor 1380 to provide the functions described herein. The one or more secondary storage devices 1384 may be, for example, one or more hard drives or the like, and may store logic 1392 to be executed by the processor 1380. The communication interface 1386 may be implemented in hardware or a combination of hardware and software. The communication interface 1386 may provide a wired or wireless network interface to a network, such as the network 106 shown in FIG. 1.

Figure 14:
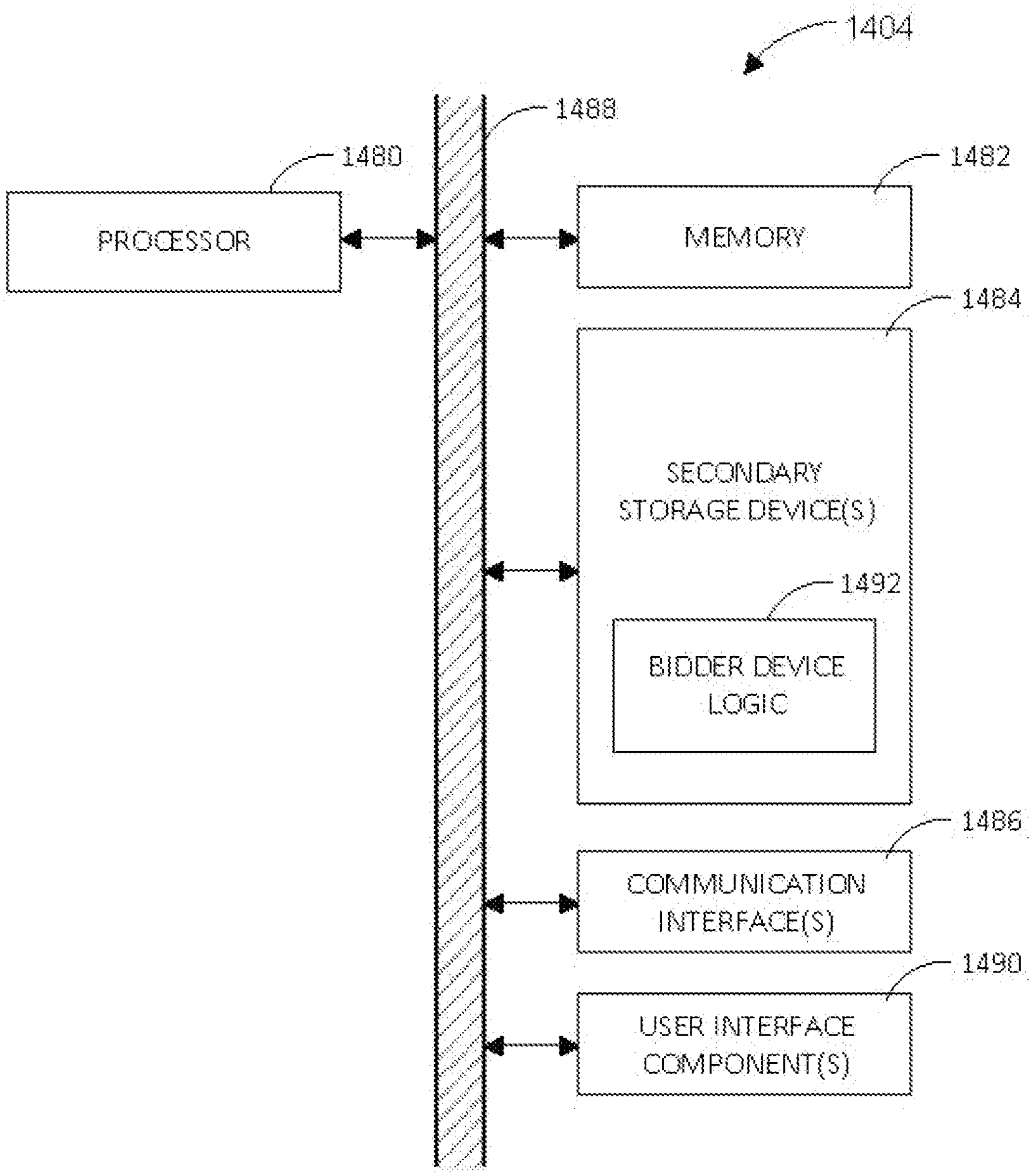
FIG. 14 is a block diagram of an example bidder device, according to an embodiment.

FIG. 14 is a block diagram of an example bidder device 1404, according to an embodiment. The bidder device 1404 may represent, for example, the bidder devices 104, 404, 504, or 604 of FIGS. 1, 4, 5, and 6, respectively. As illustrated, bidder device 1404 may include a processor or controller 1480 connected to memory 1482, one or more secondary storage devices 1484, and a communication interface 1486 by a link 1488 or similar mechanism. The bidder device 1404 may also include user interface components 1490 for use by a user of the bidder device (e.g., a bidder), that may include, for example, a touchscreen, a display, one or more user input components (e.g., a keyboard, a mouse, etc.), a speaker, or the like, or any combination thereof. Note, however, that while not shown, bidder device 1404 may include additional components. The processor 1480 may be a microprocessor, digital ASIC, FPGA, or similar hardware device. In an embodiment, the processor 1480 may be a microprocessor, and software may be stored or loaded into the memory 1482 for execution by the processor 1480 to provide the functions described herein. The one or more secondary storage devices 1484 may be, for example, one or more hard drives or the like, and may store logic 1492 to be executed by the processor 1480. The communication interface 1486 may be implemented in hardware or a combination of hardware and software. The communication interface 1486 may provide a wired or wireless network interface to a network, such as the network 106 shown in FIG. 1.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

As discussed above, one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

Technologies for providing automated non-monetary bidding based on bidder-specific data (e.g., personal data, market data, etc.) are described herein. The bidding technologies described herein may enable data specific to a person to be used as a form of collateral when the person is trying to obtain a scarce item, for example. However, the particular examples and scenarios used in this document are for ease of understanding and are not to be limiting. The technologies described herein may be used to automatically create bids in many other contexts and situations that may or may not involve people competing for a highly sought after item. For example, the systems described herein may be used for narrowing down a list of candidates, running promotional contests or other types of competitions, etc. Many other uses may also be contemplated.

An advantage of using the technologies described herein is that the technologies use already-existing data that may truly represent a person's traits, habits, and personality, as opposed to being based on an application that a person may fill out stating what he or she believes a deciding party would like to hear (which may not be indicative of the truth). Another advantage of the technologies described herein is that virtually any type of available data may be useful. For example, one data source listed herein is sensor data. Some people (e.g., avid runners) have placed sensors in their shoes to manage workouts. Keeping with the concert example used herein, if a bidder happens to have sensors in his shoes, that sensor data, along with data that shows the bidder was at a concert at a certain date and time, may show that the bidder actually danced at the concert as opposed to just stood still nodding his or her head, which may indicate a higher sense of fan enthusiasm. Many other advantages may also be contemplated.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

The following examples pertain to further embodiments.

Aggregator Examples

Example 1 may include a bidding system comprising an aggregator; one or more analyzers; and one or more data agents, wherein the aggregator is configured to: receive, from a bid acceptance server, an information request associated with a bidder; direct the one or more analyzers to analyze data collected from the one or more data agents, the data regarding one or more data points associated with the bidder and requested in the information request; receive analysis results from the one or more analyzers; package the analysis results into a bid; and provide the bid to the bid acceptance server.

Example 2 may include the subject matter of Example 1, wherein a particular analyzer of the one or more analyzers is configured to: identify instructions for collecting and analyzing the data regarding a particular data point; direct one or more of the one or more data agents to collect one or more specific data items regarding the particular data point from one or more data sources associated with the bidder; receive the specific data items regarding the particular data point from the one or more data agents; analyze the specific data items; and provide the analysis results to the aggregator.

Example 3 may include the subject matter of Example 2, wherein the instructions for collecting and analyzing the data include identification of the specific data items to collect and identification of an algorithm to use to analyze the collected data items.

Example 4 may include the subject matter of any of Examples 1-3, wherein the particular data point involves at least one of purchasing history, spending history, location history, activity history, club membership information, social networking interactions, media usage history, media recommendations, friend media usage history, or friend media recommendations.

Example 5 may include the subject matter of any of Examples 1-4, wherein the data sources include at least one of store records, credit card records, electronic receipts, location history data, club membership records, social networking history data, social networking comments, media usage records, media recommendation records, friend media usage records, friend media recommendation records, sensor data, blogs, texts, entails, other electronic messages, or electronic documents.

Example 6 may include the subject matter of any of Examples 1-5, wherein locations of the data sources include one or more of: one or more data files located on one or more devices associated with the bidder, a personal cloud associated with the bidder, one or more databases associated with services provided to or used by the bidder, or one or more websites associated with the bidder.

Example 7 may include the subject matter of any of Examples 1-6, wherein the one or more data points are limited based on input from the bidder.

Example 8 may include the subject matter of any of Examples 1-7, wherein the aggregator, the one or more analyzers, and the one or more data agents are located at the bid acceptance server.

Example 9 may include the subject matter of any of Examples 1-7, wherein the aggregator and the one or more analyzers are located at the bid acceptance server, and the one or more data agents are located at a bidding device of the bidder.

Example 10 may include the subject matter of any of Examples 1-7, wherein the aggregator is located at the bid acceptance server, and the one or more analyzers and the one or more data agents are located at a bidding device of the bidder.

Example 11 may include the subject matter of any of Examples 1-7, wherein the aggregator, the one or more analyzers, and the one or more data agents are located at a bidding device of the bidder.

Example 12 may include a computer readable medium storing control logic configured to instruct a processor of a computing device to: receive, from a bid acceptance server, an information request associated with a bidder; direct one or more analyzers to collect and analyze data regarding one or more data points associated with the bidder and requested in the information request; receive analysis results from the one or more analyzers; package the analysis results into a bid; and provide the bid to the bid acceptance server.

Example 13 may include an apparatus comprising: means for receiving, from a bid acceptance server, an information request associated with a bidder; means for directing one or more analyzers to collect and analyze data regarding one or more data points associated with the bidder and requested in the information request; means for receiving analysis results from the one or more analyzers; means for packaging the analysis results into a bid; and means for providing the bid to the bid acceptance server.

Example 14 may include a method comprising: receiving, from a bid acceptance server, an information request associated with a bidder; directing one or more analyzers to collect and analyze data regarding one or more data points associated with the bidder and requested in the information request; receiving analysis results from the one or more analyzers; packaging the analysis results into a bid; and providing the bid to the bid acceptance server.

Example 15 may include the subject matter of Example 14, wherein the directing of one or more analyzers includes directing a particular analyzer to: identify instructions for collecting and analyzing data regarding a particular data point; direct one or more data agents to collect one or more specific data items regarding the particular data point from one or more data sources associated with the bidder; receive the specific data items regarding the particular data point from the one or more data agents; and analyze the specific data items.

Example 16 may include the subject matter of Example 15, wherein the identifying instructions includes: identifying the specific data items to collect; and identifying an algorithm to use to analyze the collected data items.

Example 17 may include the subject matter of any of Examples 14-16, wherein the one or more data points are limited based on input from the bidder.

Example 18 may include at least one computer readable medium comprising a plurality of instructions that in response to being executed on a computing device, cause the computing device to carry out a method according to any one of Examples 14-17.

Example 19 may include an apparatus comprising means for performing the method of any one of Examples 14-17.

Example 20 may include a method comprising: receiving, from a bid acceptance server, an information request associated with a bidder; collecting and analyzing data regarding one or more data points associated with the bidder and requested in the information request; packaging analysis results into a bid; and providing the bid to the bid acceptance server.

Example 21 may include the subject matter of Example 20, wherein the collecting and analyzing the data regarding a particular data point includes: identifying instructions for collecting and analyzing the data regarding the particular data point; collecting one or more specific data items regarding the particular data point from one or more data sources associated with the bidder; and analyzing the specific data items.

Example 22 may include the subject matter of Example 21, wherein the identifying instructions includes: identifying the specific data items to collect; and identifying an algorithm to use to analyze the collected data items.

Example 23 may include the subject matter of any of Examples 20-22, wherein the one or more data points are limited based on input from the bidder.

Example 24 may include at least one computer readable medium comprising a plurality of instructions that in response to being executed on a computing device, cause the computing device to carry out a method according to any one of Examples 20-23.

Example 25 may include an apparatus comprising means for performing the method of any one of Examples 20-23.

Bid Acceptance Server Examples

Example 1 may include a bid acceptance server comprising a processor and a memory in communication with the processor, the memory having stored therein a plurality of instructions adapted to direct the processor to: provide one or more information requests each respectively associated with a bidder to one or more aggregators respectively assigned to each bidder; and receive a bid associated with each bidder from each respective aggregator, wherein each bid is a non-monetary bid based on an analysis of electronically-available collected data associated with a particular bidder.

Example 2 may include the subject matter of Example 1, wherein the plurality of instructions are adapted to further direct the processor to, prior to providing the one or more information requests: send one or more bid confirmation requests to one or more potential bidders via one or more devices respectively associated with the potential bidders; and receive one or more acknowledgements from the bidder devices confirming that one or more of the potential bidders intend to provide a bid.

Example 3 may include the subject matter of Example 2, wherein the bid confirmation requests each include an inquiry into what types of data each respective potential bidder will allow to be included; the acknowledgements from the bidder devices each include information specifying what types of data each respective confirmed bidder will allow to be included; and the information request provided to the aggregator includes the information specifying what types of data each respective confirmed bidder will allow to be included.

Example 4 may include the subject matter of any of Examples 1-3, wherein the plurality of instructions are adapted to further direct the processor to provide a data collection tool to devices respectively associated with the bidders.

Example 5 may include the subject matter of any of Examples 1-4, wherein the plurality of instructions are adapted to further direct the processor to rank the received bids according to a given algorithm.

Example 6 may include the subject matter of any of Examples 1-5, wherein the plurality of instructions are adapted to further direct the processor to stop collecting bids after a given threshold number of bids has been reached.

Example 7 may include a computer readable medium storing control logic configured to instruct a processor of a computing device to: provide one or more information requests each respectively associated with a bidder to one or more aggregators respectively assigned to each bidder; and receive a bid associated with each bidder from each respective aggregator, wherein each bid is a non-monetary bid based on an analysis of electronically-available collected data associated with a particular bidder.

Example 8 may include the subject matter of Example 7, wherein the control logic is further configured to direct the processor to, prior to providing the one or more information requests: send one or more bid confirmation requests to one or more potential bidders is one or more devices respectively associated with the potential bidders; and receive one or more acknowledgements from the bidder devices confirming that one or more of the potential bidders intend to provide a bid.

Example 9 may include the subject matter of Example 8, wherein the bid confirmation requests each include an inquiry into what types of data each respective potential bidder will allow to be included; the acknowledgements from the bidder devices each include information specifying what types of data each respective confirmed bidder will allow to be included; and the information request provided to the aggregator includes the information specifying what types of data each respective confirmed bidder will allow to be included.

Example 10 may include the subject matter of any of Examples 7-9, wherein the control logic is further configured to direct the processor to provide a data collection tool to devices respectively associated with the bidders.

Example 11 may include the subject matter of any of Examples 7-10, wherein the control logic is further configured to direct the processor to rank the received bids according to a given algorithm.

Example 12 may include the subject matter of any of Examples 7-11, wherein the control logic is further configured to direct the processor to stop collecting bids after a given threshold number of bids has been reached.

Example 13 may include an apparatus comprising: means for providing one or more information requests each respectively associated with a bidder to one or more aggregators respectively assigned to each bidder; and means for receiving a bid associated with each bidder from each respective aggregator, wherein each bid is a non-monetary bid based on an analysis of electronically-available collected data associated with a particular bidder.

In Example 14, the subject matter of Example 13 may optionally include: means for sending, prior to providing the one or more information requests, one or more bid confirmation requests to one or more potential bidders via one or more devices respectively associated with the potential bidders; and means for receiving one or more acknowledgements from the bidder devices confirming that one or more of the potential bidders intend to provide a bid.

Example 15 may include the subject matter of Example 14, wherein the bid confirmation requests each include an inquiry into what types of data each respective potential bidder will allow to be included; the acknowledgements from the bidder devices each include information specifying what types of data each respective confirmed bidder will allow to be included; and the information request provided to the aggregator includes the information specifying What types of data each respective confirmed bidder will allow to be included.

In Example 16, the subject matter of any of Examples 13-15 may optionally include means for providing a data collection tool to devices respectively associated with the bidders.

In Example 17, the subject matter of any of Examples 13-16 may optionally include means for ranking the received bids according to a given algorithm.

In Example 18, the subject matter of any of Examples 13-17 may optionally include means for stopping collection of bids after a given threshold number of bids has been reached.

Example 19 may include a method of bid collection comprising: providing one or more information requests each respectively associated with a bidder to one or more aggregators respectively assigned to each bidder; and receiving a bid associated with each bidder from each respective aggregator, wherein each bid is a non-monetary bid based on an analysis of electronically-available collected data associated with a particular bidder.

In Example 20, the subject matter of Example 19 may optionally include, prior to providing the one or more information requests: sending one or more bid confirmation requests to one or more potential bidders via one or more devices respectively associated with the potential bidders; and receiving one or more acknowledgements from the bidder devices confirming that one or more of the potential bidders intend to provide a bid.

Example 21 may include the subject matter of Example 20, wherein the bid confirmation requests each include an inquiry into what types of data each respective potential bidder will allow to be included; the acknowledgements from the bidder devices each include information specifying what types of data each respective confirmed bidder will allow to be included; and the information request provided to the aggregator includes the information specifying what types of data each respective confirmed bidder will allow to be included.

In Example 22, the subject matter of any of Examples 19-21 may optionally include providing a data collection tool to devices respectively associated with the bidders.

In Example 23, the subject matter of any of Examples 19-22 may optionally include ranking the received bids according to a given algorithm.

In Example 24, the subject matter of any of Examples 19-23 may optionally include stopping collection of bids after a given threshold number of bids has been reached.

Example 25 may include at least one computer readable medium comprising a plurality of instructions that in response to being executed on a computing device, cause the computing device to carry out a method according to any one of Examples 19-24.

Example 26 may include an apparatus comprising means for performing the method of any one of Examples 19-24.

Analyzer Examples

Example 1 may include an apparatus for use in a bidding system, comprising: an analyzer; and one or more data agents, wherein the analyzer is configured to: receive a request, from a requesting device, to collect and analyze data regarding one or More data points associated with a bidder; identify instructions for collecting and analyzing the data regarding the one or more data points; for each of the one or more data points, direct the one or more data agents to collect one or more specific data items regarding the data point from one or more data sources associated with the bidder, and receive the specific data items regarding the data point from the one or more data agents; analyze the specific data items; and provide results of the data analysis to the requesting device for bid packaging.

Example 2 may include the subject matter of Example 1, wherein the identifying of instructions comprises identifying the specific data items to collect and identifying an algorithm to use to analyze the collected data items.

Example 3 may include the subject matter of any of Examples 1-2, wherein the analyzer and the one or more data agents are located at the requesting device.

Example 4 may include the subject matter of any of Examples 1-2, wherein the analyzer and the one or more data agents are located at a bidding device of the bidder.

Example 5 may include the subject matter of any of Examples 1-2, wherein the analyzer is located at the requesting device, and the one or more data agents are located at a bidding device of the bidder.

Example 6 may include the subject matter of any of Examples 1-5, wherein each of the one or more data points involves at least one of purchasing history, spending history, location history, activity history, club membership information, social networking interactions, media usage history, media recommendations, friend media usage history, and friend media recommendations.

Example 7 may include the subject matter of any of Examples 1-6, wherein the data sources include at least one of store records, credit card records, electronic receipts, location history data club membership records, social networking history data social networking comments, media usage records, media recommendation records, friend media usage records, friend media recommendation records, sensor data, blogs, texts, emails, other electronic messages, and electronic documents.

Example 8 may include the subject matter of any of Examples 1-7, wherein locations of the data sources include one or more of one or more data files located on one or more devices associated with the bidder, a personal cloud associated with the bidder, one or more databases associated with services provided to or used by the bidder, and one or more websites associated with the bidder.

Example 9 may include a computer readable medium storing control logic configured to instruct a processor of a computing device to: receive a request, from a requesting device, to collect and analyze data regarding one or more data points associated with a bidder; identify instructions for collecting and analyzing information regarding the one or more data points; for each of the one or more data points, direct one or more data agents to collect one or more specific data items regarding the data point from one or more data sources associated with the bidder, and receive the specific data items regarding the data point from the one or more data agents; analyze the specific data items; and provide results of the data analysis to the requesting device for bid packaging.

Example 10 may include the subject matter of Example 9, wherein the identifying of instructions comprises identifying the specific data items to collect and identifying an algorithm to use to analyze the collected data items.

Example 11 may include an apparatus comprising: means for receiving, from a requesting device, a request to collect and analyze data regarding one or more data points associated with a bidder; means for identifying instructions for collecting and analyzing data regarding the one or more data points; means for, for each of the one or more data points, directing one or more data agents to collect one or more specific data items regarding the data point from one or more data sources associated with the bidder and receiving the specific data items regarding the data point from the one or more data agents; means for analyzing the specific data items; and means for providing results of the data analysis to the requesting device for bid packaging.

Example 12 may include the subject matter of Example 11, wherein the means for identifying instructions comprises: means for identifying the specific data items to collect; and means for identifying an algorithm to use to analyze the collected data items.

Example 13 may include a method of analyzing data, comprising: receiving, from a requesting device, a request to collect and analyze data regarding one or more data points associated with a bidder; identifying instructions for collecting and analyzing data regarding the one or more data points; for each of the one or more data points, directing one or more data agents to collect one or more specific data items regarding the data point from one or more data sources associated with the bidder, and receiving the specific data items regarding the data point from the one or more data agents; analyzing the specific data items; and providing results of the data analysis to the requesting device for bid packaging.

Example 14 may include the subject matter of Example 13, wherein the identifying of instructions includes: identifying the specific data items to collect; and identifying an algorithm to use to analyze the collected data items.

Example 15 may include at least one computer readable medium comprising a plurality of instructions that in response to being executed on a computing device, cause the computing device to carry out a method according to any one of Examples 13-14.

Example 16 may include an apparatus comprising means for performing the method of any one of Examples 13-14.

Example 17 may include a method of analyzing data, comprising: receiving, from a requesting device, a request to collect and analyze data regarding one or more data points associated with a bidder; identifying instructions for collecting and analyzing data regarding the one or more data points; for each of the one or more data points, collecting one or more specific data items regarding the data point from one or more data sources associated with the bidder, and receiving the specific data items regarding the data point from the one or more data agents; analyzing the specific data items; and providing results of the data analysis to the requesting device for bid packaging.

Example 18 may include the subject matter of Example 17, wherein the identifying of instructions includes: identifying the specific data items to collect; and identifying an algorithm to use to analyze the collected data items.

Example 19 may include at least one computer readable medium comprising a plurality of instructions that in response to being executed on a computing device, cause the computing device to carry out a method according to any one of Examples 17-18.

Example 20 may include an apparatus comprising means for performing the method of any one of Examples 17-18.

Bidder Device Examples

Example 1 may include a computing device comprising a processor; a user interface; and a memory in communication with the processor, the memory having stored therein a plurality of instructions adapted to direct the processor to: receive a bid confirmation request from a bid acceptance server; present the bid confirmation request to a bidder via the user interface; receive input from the bidder regarding the bid confirmation request via the user interface; and provide a response to the bid confirmation request to the bid acceptance server based on the received input from the bidder.

Example 2 may include the subject matter of Example 1, wherein the bid confirmation request includes one or more of an inquiry into whether the bidder intends to submit a bid and an inquiry into what types of data the bidder will allow to be included.

Example 3 may include the subject matter of any of Examples 1-2, wherein the response includes one or more of an acknowledgement from the bidder that the bidder intends to submit a bid and information specifying what types of data the bidder will allow to be included.

Example 4 may include the subject matter of any of Examples 1-3, wherein the plurality of instructions is further adapted to direct the processor to: receive a data collection tool from the bid acceptance server; and execute the data collection tool.

Example 5 may include the subject matter of Example 4, wherein the data collection tool includes one or more of: an aggregator agent configured to aggregate analyzed data associated with the bidder; one or more analyzer agents configured to analyze the data associated with the bidder; and one or more data agents configured to collect the data associated with the bidder.

Example 6 may include a computer readable medium storing control logic configured to instruct a processor of a computing device to: receive a bid confirmation request from a bid acceptance server; present the bid confirmation request to a bidder via a user interface; receive input from the bidder regarding the bid confirmation request via the user interface; and provide a response to the bid confirmation request to the bid acceptance server based on the received input from the bidder.

Example 7 may include the subject matter of Example 6, wherein the bid confirmation request includes one or more of an inquiry into whether the bidder intends to submit a bid and an inquiry into what types of data the bidder will allow to be included.

Example 8 may include the subject matter of any of Examples 6-7, wherein the response includes one or more of an acknowledgement from the bidder that the bidder intends to submit a bid and information specifying what types of data the bidder will allow to be included.

Example 9 may include the subject matter of any of Examples 6-8, wherein the control logic is further configured to direct the processor to: receive a data collection tool from the bid acceptance server; and execute the data collection tool.

Example 10 may include the subject matter of Example 9, wherein the data collection tool includes one or more of: an aggregator agent configured to aggregate analyzed data associated with the bidder; one or more analyzer agents configured to analyze the data associated with the bidder; and one or more data agents configured to collect the data associated with the bidder.

Example 11 may include an apparatus comprising: means for receiving a bid confirmation request from a bid acceptance server; means for presenting the bid confirmation request to a bidder via a user interface; means for receiving input from the bidder regarding the bid confirmation request via the user interface; and means for providing a response to the bid confirmation request to the bid acceptance server based on the received input from the bidder.

Example 12 may include the subject matter of Example 11, wherein the bid confirmation request includes one or more of an inquiry into whether the bidder intends to submit a bid and an inquiry into what types of data the bidder will allow to be included.

Example 13 may include the subject matter of any of Examples 11-12, wherein the response includes one or more of an acknowledgement from the bidder that the bidder intends to submit a bid and information specifying what types of data the bidder will allow to be included.

In Example 14, the subject matter of any of Examples 11-13 may optionally include means hr receiving a data collection tool from the bid acceptance server; and means for executing the data collection tool.

Example 15 may include the subject matter of Example 14, wherein the data collection tool includes one or more of: an aggregator agent configured to aggregate analyzed data associated with the bidder; one or more analyzer agents configured to analyze the data associated with the bidder; and one or more data agents configured to collect the data associated with the bidder.

Example 16 may include a method comprising: receiving a bid confirmation request from a bid acceptance server; presenting the bid confirmation request to a bidder via a user interface; receiving input from the bidder regarding the bid confirmation request via the user interface; and providing a response to the bid confirmation request to the bid acceptance server based on the received input from the bidder.

Example 17 may include the subject matter of Example 16, wherein the bid confirmation request includes one or more of an inquiry into whether the bidder intends to submit a bid and an inquiry into what types of data the bidder will allow to be included.

Example 18 may include the subject matter of any of Examples 16-17, wherein the response includes one or more of an acknowledgement from the bidder that the bidder intends to submit a bid and information specifying what types of data the bidder will allow to be included.

In Example 19, the subject matter of any of Examples 16-18 may optionally include receiving a data collection tool from the bid acceptance server; and executing the data collection tool.

Example 20 may include the subject matter of Example 19, wherein the data collection tool includes one or more of: an aggregator agent configured to aggregate analyzed data associated with the bidder; one or more analyzer agents configured to analyze the data associated with the bidder; and one or more data agents configured to collect the data associated with the bidder.

Example 21 may include at least one computer readable medium comprising a plurality of instructions that in response to being executed on a computing device, cause the computing device to carry out a method according to any one of Examples 16-20.

Example 22 may include an apparatus comprising means for performing the method of any one of Examples 16-20.

What is claimed is:

1. A method for providing a bid to a bid acceptance server, comprising:

receiving, by an aggregator, an information request from the bid acceptance server, wherein the information request includes a query to ascertain if a trait associated with a bidder of a reward corresponds to a trait of interest to a provider of the reward;

determining, by an analyzer, a type of information to collect regarding the bidder based on the query, the information including physical activity of the bidder specific to one or more locations recorded with one or more sensors, collecting, with a data agent, the type of information regarding the bidder from one or more computer accessible information sources, including the bidder's physical activity specific to the one or more locations recorded with the one or more sensors, and on receipt of the collected type of information, analyzing, with the analyzer, the collected type of information regarding the bidder;

packaging, by the aggregator, analysis results regarding the bidder into the bid that includes a summary of a-the trait of the bidder that corresponds to the trait of interest to the provider of the reward; and providing, by the aggregator, the bid to the bid acceptance server.

2. The method of claim 1, further including:

constructing, by the aggregator, a bid for each of multiple bidders, each bid to include a summary of a trait of the respective bidder that corresponds to the trait of interest to the provider of the reward;

the bid acceptance server to select a subset of the bids as winning bids based at least in part on the respective summaries.

3. The method of claim 2, further including:

ranking, by the aggregator, the bids of the multiple bidders based on the respective summaries;

wherein the selecting a subset of the bids includes, at the bid acceptance server, selecting the subset of the bids based at least in part on the respective rankings.

4. The method of claim 2, wherein the information request includes multiple queries regarding the bidder that are based on multiple traits of interest to a provider of the reward, the method further including:

performing the receiving, the determining, the collecting, and the packaging for each of multiple bidders, for each of multiple traits of interest to the provider, to provide multiple-trait characterizations for each of the bidders, wherein the constructing includes constructing a bid for each of the multiple bidders based on the multiple-trait characterizations of the respective bidders, the bid acceptance server to select a subset of the bidders to receive the reward based at least in part on the multiple-trait characterizations of the respective bidders.

5. The method of claim 4, further including:

ranking, by the aggregator, the bidders based on the multiple-trait characterizations of the respective bidders, the bid acceptance server to select the subset of the bidders to receive the reward based at least in part on the respective rankings.

6. The method of claim 1, wherein the reward includes a ticket to an event, and wherein the analyzer is further to analyze the bidder with respect to a likelihood that the bidder will advance a business interest of one or more of the event and a venue of the event.

7. The method of claim 1, wherein the reward includes a ticket to an event, and wherein characterizing includes characterizing the bidder with respect to one or more of:

whether the bidder will personally attend the event;

whether the bidder will purchase goods and/or services during the event;

whether the bidder will attend other events at a venue of the event;

whether the bidder has attended similar events;

whether the bidder has danced, participated or stood still at similar events that the bidder has attended; whether the bidder owns recordings of similar events;

whether the bidder is able to generate publicity regarding the event and/or the venue through social media; and whether the bidder is able to change a musical listening habit of another through social media.

8. The method of claim 1, wherein the analyzer is further to determine to collect types of information related to other events attended by the bidder based on the trait of interest and the event.

9. An apparatus for collecting data in connection with a bidder of a bid for a reward, the bid to be submitted to a bid acceptance server, comprising:

a processor communicably coupled to one or more sensors, the one or more sensors recording physical activity of a bidder specific to one or more locations; and a memory, the apparatus to:

receive, from an analyzer, a type of information regarding the bidder to collect from one or more computer accessible information sources, the information including the bidder's physical activity specific to one or more locations recorded by the one or more sensors, wherein the type of information regarding the bidder to collect is determined by the analyzer based on a query, the query received by an aggregator as part of an information request, the query to ascertain if a trait associated with the bidder for the reward corresponds to a trait of interest to a provider of the reward;

in response to the receipt of the type of information to collect, collect the type of information, including the bidder's physical activity specific to the one or more locations recorded by the one or more sensors; and provide the collected type of information to the analyzer, the analyzer to analyze the collected type of information regarding the bidder and provide analysis results to the aggregator, the aggregator to:

package the analysis results regarding the bidder into the bid, the analysis results to include a summary of the trait of the bidder that corresponds to the trait of interest to the provider of the reward; and provide the bid to the bid acceptance server.

10. The apparatus of claim 9, wherein: the aggregator is further to construct a bid for each of multiple bidders, each bid to include a summary of a trait of the respective bidder that corresponds to the trait of interest to the provider of the reward; and the bid acceptance server is configured to select a subset of the bids as winning bids based at least in part on the respective summaries.

11. The apparatus of claim 10, wherein: the aggregator is further to rank the bids of the multiple bidders based on the respective summaries; and the bid acceptance server is further to select the subset of bids based at least in part on the respective rankings.

12. The apparatus of claim 9, wherein the information request received by the aggregator includes multiple queries regarding the bidder that are based on multiple traits of interest to a provider of the reward, and wherein the apparatus is further to:

receive from the analyzer a type of information to collect regarding the bidder for each of the multiple queries, the information including the bidder's physical activity specific to one or more locations recorded by the one or more sensors, the type of information to collect determined by the analyzer for each of the multiple queries;

collect the type of information regarding the bidder, including the bidder's physical activity specific to the one or more locations recorded by the one or more sensors, for each of the multiple queries; and provide the collected type of information to the analyzer, the analyzer to analyze the collected type of information regarding the bidder and provide the analysis results to the aggregator, the aggregator to package the analysis results regarding the bidder into the bid, the analysis results to include a summary of multiple traits of the bidder that correspond to the multiple traits of interest to the provider of the reward.

13. The apparatus of claim 12, wherein: the aggregator is further to package the bids of multiple bidders to include a summary of multiple traits of the respective bidder that correspond to the multiple traits of interest to the provider of the reward, and rank the bids of the multiple bidders based on the summaries of multiple traits of the respective bidders.

14. The apparatus of claim 9, wherein the reward includes a ticket to an event, and wherein the information request to the aggregator includes a query to ascertain whether the bidder will advance a business interest of one or more of the event and a venue of the event.

15. The apparatus of claim 9, wherein the reward includes a ticket to an event, and wherein the information request includes a query to ascertain one or more of:

whether the bidder will personally attend the event;

whether the bidder will purchase goods and/or services during the event; whether the bidder will attend other events at a venue of the event;

whether the bidder has attended similar events;

whether the bidder has danced, participated or stood still at similar events that the bidder has attended;

whether the bidder owns recordings of similar events;

whether the bidder is able to generate publicity regarding the event and/or the venue through social media; and whether the bidder is able to change a musical listening habit of another through social media.

16. The apparatus of claim 15, further to spawn the analyzer to receive from the analyzer types of information to collect related to other events attended by the bidder based on the trait of interest and the event.

* * * * *